US009760195B2

(12) United States Patent
Krah et al.

(10) Patent No.: US 9,760,195 B2
(45) Date of Patent: Sep. 12, 2017

(54) POWER MANAGEMENT FOR INTEGRATED TOUCH SCREENS

(75) Inventors: Christoph Horst Krah, Los Altos, CA (US); Kevin J. White, Los Gatos, CA (US); Yafei Bi, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 227 days.

(21) Appl. No.: 13/244,072

(22) Filed: Sep. 23, 2011

(65) Prior Publication Data

US 2013/0076648 A1    Mar. 28, 2013

(51) Int. Cl.
G06F 3/041    (2006.01)
G06F 3/045    (2006.01)
G06F 3/044    (2006.01)

(52) U.S. Cl.
CPC ............ *G06F 3/0412* (2013.01); *G06F 3/044* (2013.01); *G06F 3/0418* (2013.01)

(58) Field of Classification Search
CPC ...... G06F 3/044; G06F 3/0416; G06F 3/0412; G06F 3/0418
See application file for complete search history.

(56) References Cited

U.S. PATENT DOCUMENTS

| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 5,896,120 A | 4/1999 | Iguchi et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |

(Continued)

FOREIGN PATENT DOCUMENTS

| JP | 9-050347 A | 2/1997 |
| JP | 2000-163031 A | 6/2000 |
| JP | 2002-342033 A | 11/2002 |
| TW | 201118683 A1 | 6/2011 |
| TW | I363292 B | 5/2012 |
| WO | WO-2013/043337 A1 | 3/2013 |

OTHER PUBLICATIONS

International Search Report mailed Oct. 23, 2012, for PCT Application No. PCT/US2012/052934, four pages.

(Continued)

*Primary Examiner* — Alexander Eisen
*Assistant Examiner* — Nan-Ying Yang
(74) *Attorney, Agent, or Firm* — Morrison & Foerster LLP

(57) ABSTRACT

Reducing or eliminating the effects of noise that can be generated by a power system of a touch screen device, such as a gate line voltage system that applies voltage to gate lines of the touch screen, is provided. In one example, a power supply, such as a charge pump, can be disabled during active touch sensing, such that noise from the charge pump is not generated during touch sensing. In some examples, a voltage regulator can help to maintain the gate voltage level at or above a desired threshold. In some cases, noise entering the touch sensing system can have a lasting effect on noise-sensitive components, even after the noise source is disabled. In these cases, a post-noise stabilizing system can be included to stabilize, reset, etc., noise-sensitive components of the touch sensing system, which can help to reduce or eliminate the lasting effect of noise.

32 Claims, 14 Drawing Sheets

(56) References Cited

U.S. PATENT DOCUMENTS

| | | | |
|---|---|---|---|
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 8,884,909 | B2 | 11/2014 | Huang et al. |
| 2002/0154104 | A1* | 10/2002 | Inoue et al. ............ 345/204 |
| 2003/0051927 | A1 | 3/2003 | Inamori |
| 2005/0264472 | A1* | 12/2005 | Rast ........................ 345/30 |
| 2006/0026521 | A1 | 2/2006 | Hotelling et al. |
| 2006/0103635 | A1 | 5/2006 | Park |
| 2006/0197753 | A1 | 9/2006 | Hotelling |
| 2008/0309622 | A1* | 12/2008 | Krah ....................... 345/173 |
| 2009/0251433 | A1* | 10/2009 | Park et al. ............... 345/173 |
| 2010/0053083 | A1 | 3/2010 | Hwang |
| 2010/0194707 | A1* | 8/2010 | Hotelling et al. ........ 345/173 |
| 2011/0018825 | A1 | 1/2011 | Kondo et al. |
| 2011/0061947 | A1 | 3/2011 | Krah et al. |
| 2011/0102406 | A1* | 5/2011 | Wang et al. ............. 345/211 |
| 2011/0210939 | A1* | 9/2011 | Reynolds et al. ........ 345/174 |
| 2011/0227633 | A1 | 9/2011 | Mo et al. |
| 2012/0154322 | A1* | 6/2012 | Yang et al. .............. 345/174 |

OTHER PUBLICATIONS

Lee, S.K. et al. (Apr. 1985). "A Multi-Touch Three Dimensional Touch-Sensitive Tablet," Proceedings of CHI: ACM Conference on Human Factors in Computing Systems, pp. 21-25. [Crossed-out by Examiner).

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages. (Re-submit).

Rubine, D.H. (May 1992). "Combining Gestures and Direct Manipulation," CHI '92, pp. 659-660. (Re-submit).

Search Report for ROC (Taiwan) dated Sep. 15, 2014, for Patent Application No. 101133194, with English translation, two pages.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages. (Re-submit).

\* cited by examiner

POWER MANAGEMENT FOR INTEGRATED TOUCH SCREENS

FIELD OF THE DISCLOSURE

This relates generally to touch sensing, and more particularly, to power management for integrated display touch controllers.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing fields used to detect touch can extend beyond the surface of the display, and objects approaching near the surface may be detected near the surface without actually touching the surface.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. Some touch screens can be formed by integrating touch sensing circuitry into a display pixel stackup (i.e., the stacked material layers forming the display pixels).

SUMMARY

The following description includes examples of reducing or eliminating the effects of noise that can be generated by a power system of a touch screen device, such as a gate line voltage system that applies voltage to gate lines of the touch screen. In one example, a power supply, such as a charge pump, can be disabled during active touch sensing, such that noise from the charge pump is not generated during touch sensing. In some examples, a voltage regulator can help to maintain the gate voltage level at or above a desired threshold. Some examples can include a voltage boost system that can increase the magnitude of the voltage applied to the gate lines during the touch sensing phase, which can help maintain the gate voltage level during the touch sensing phase. In some cases, noise entering the touch sensing system can have a lasting effect on noise-sensitive components, even after the noise source is disabled, for example. In these cases, for example, a post-noise stabilizing system can be included to stabilize, reset, etc., noise-sensitive components of the touch sensing system, which can help to reduce or eliminate the lasting effect of noise.

DETAILED DESCRIPTION

In the following description of example embodiments, reference is made to the accompanying drawings which form a part hereof, and in which it is shown by way of illustration specific embodiments in which embodiments of the disclosure can be practiced. It is to be understood that other embodiments can be used and structural changes can be made without departing from the scope of the embodiments of this disclosure.

The following description includes examples of reducing or eliminating the effects of noise that can be generated by a power system of a touch screen device, such as a gate line voltage system that applies voltage to gate lines of the touch screen. In one example, a power supply, such as a charge pump, can be disabled during active touch sensing, such that noise from the charge pump is not generated during touch sensing. In some examples, a voltage regulator can help to maintain the gate voltage level at or above a desired threshold. Some examples can include a voltage boost system that can increase the magnitude of the voltage applied to the gate lines during the touch sensing phase, which can help maintain the gate voltage level during the touch sensing phase. In some cases, noise entering the touch sensing system can have a lasting effect on noise-sensitive components, even after the noise source is disabled, for example. In these cases, for example, a post-noise stabilizing system can be included to stabilize, reset, etc., noise-sensitive components of the touch sensing system, which can help to reduce or eliminate the lasting effect of noise.

As touch sensing circuitry becomes more closely integrated with circuitry of other systems, undesirable interaction between circuit elements of different systems can be more likely to occur. For example, touch sensing circuitry can be integrated into the display pixel stackups of integrated touch screens. Display pixel stackups are typically manufactured by processes including depositing, masking, etching, doping, etc., of materials such as conductive materials (e.g., metal, substantially transparent conductors), semiconductive materials (e.g., polycrystalline silicon (Poly-Si)), and dielectric materials (e.g., $SiO_2$, organic materials, $SiN_x$). Various elements formed within a display pixel stackup can operate as circuitry of the display system to generate an image on the display, while other elements can operate as circuitry of a touch sensing system that senses one or more touches on or near the display.

Figure 1C:
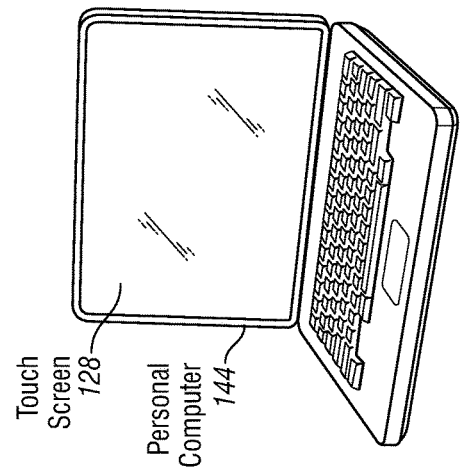
FIGS. 1A-1C illustrate an example mobile telephone, an example media player, and an example personal computer that each include an example touch screen according to embodiments of the disclosure.
Figure 1B:
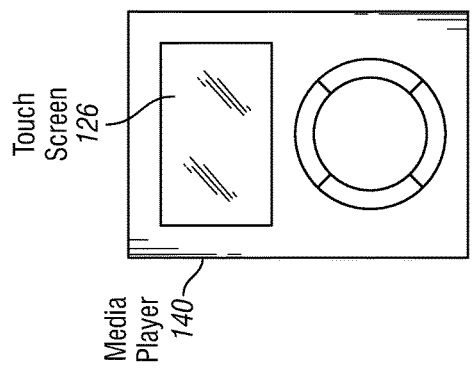
Figure 1A:
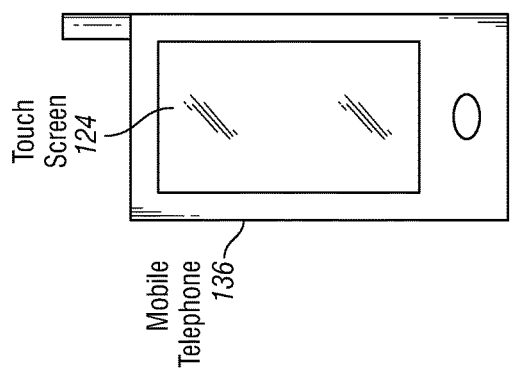

FIGS. 1A-1C show example systems in which a touch screen according to embodiments of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. Although not shown in the figures, the personal computer 144 can also be a tablet computer or a desktop computer with a touch-sensitive display. Touch screens 124, 126, and 128 may be based on, for example, self capacitance or mutual capacitance, or another touch sensing technology. For example, in a self capacitance based touch system, an individual electrode with a self-capacitance to ground can be used to form a touch pixel for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen. A mutual capacitance based touch system can include, for example, drive regions and sense regions, such as drive lines and sense lines. For example, drive lines can be formed in rows while sense lines can be formed in columns (e.g., orthogonal). Touch pixels can be formed at the intersections of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some embodiments, a touch screen can be multi-touch, single touch, projection scan, full-imaging multi-touch, or any capacitive touch.

Figure 2:
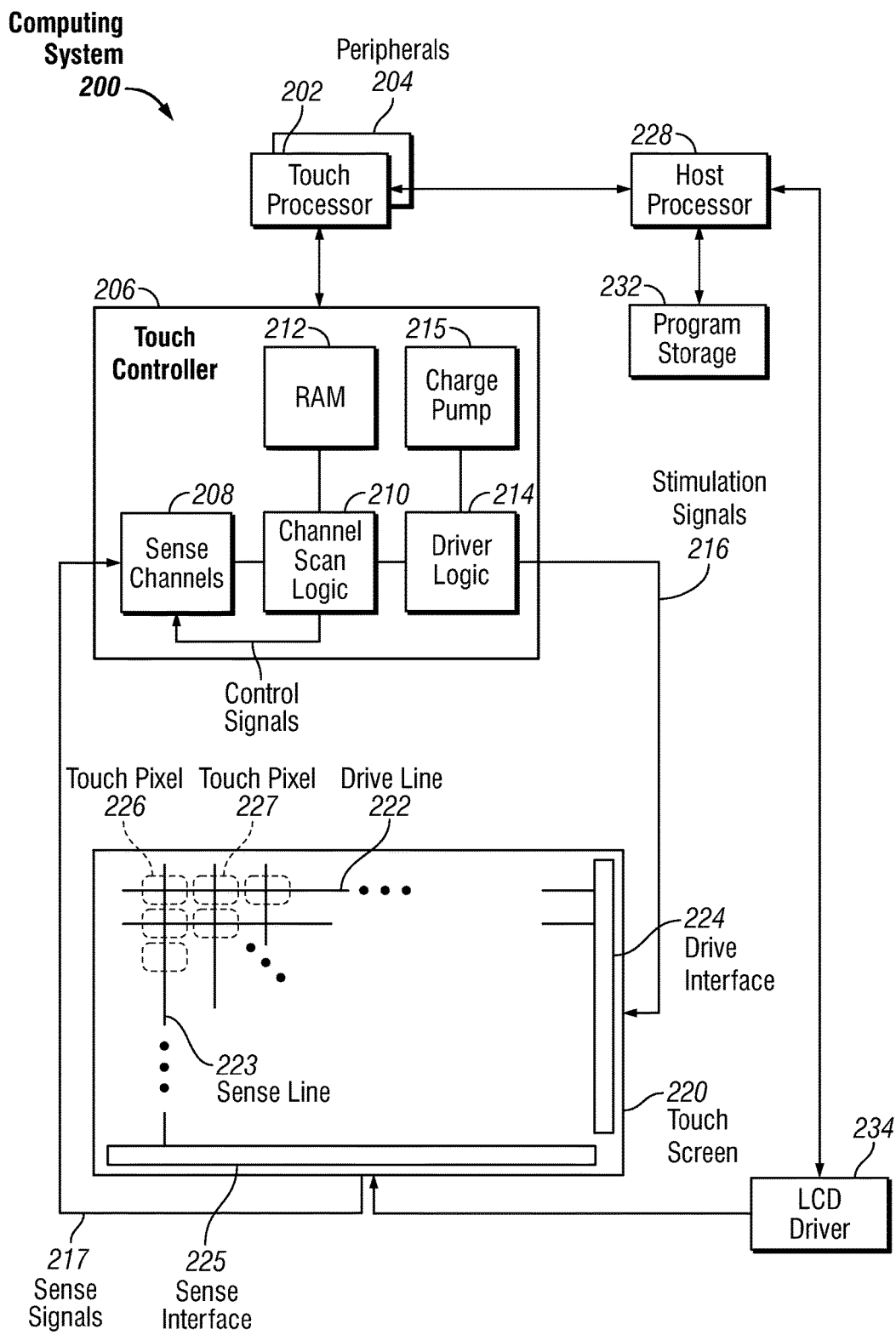
FIG. 2 is a block diagram of an example computing system that illustrates one implementation of an example touch screen according to embodiments of the disclosure.

FIG. 2 is a block diagram of an example computing system 200 that illustrates one implementation of an example touch screen 220 according to embodiments of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive regions of the touch sensing circuitry of touch screen 220, as described in more detail below. In some embodiments, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 223. It should be noted that the term "lines" is a sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 3:
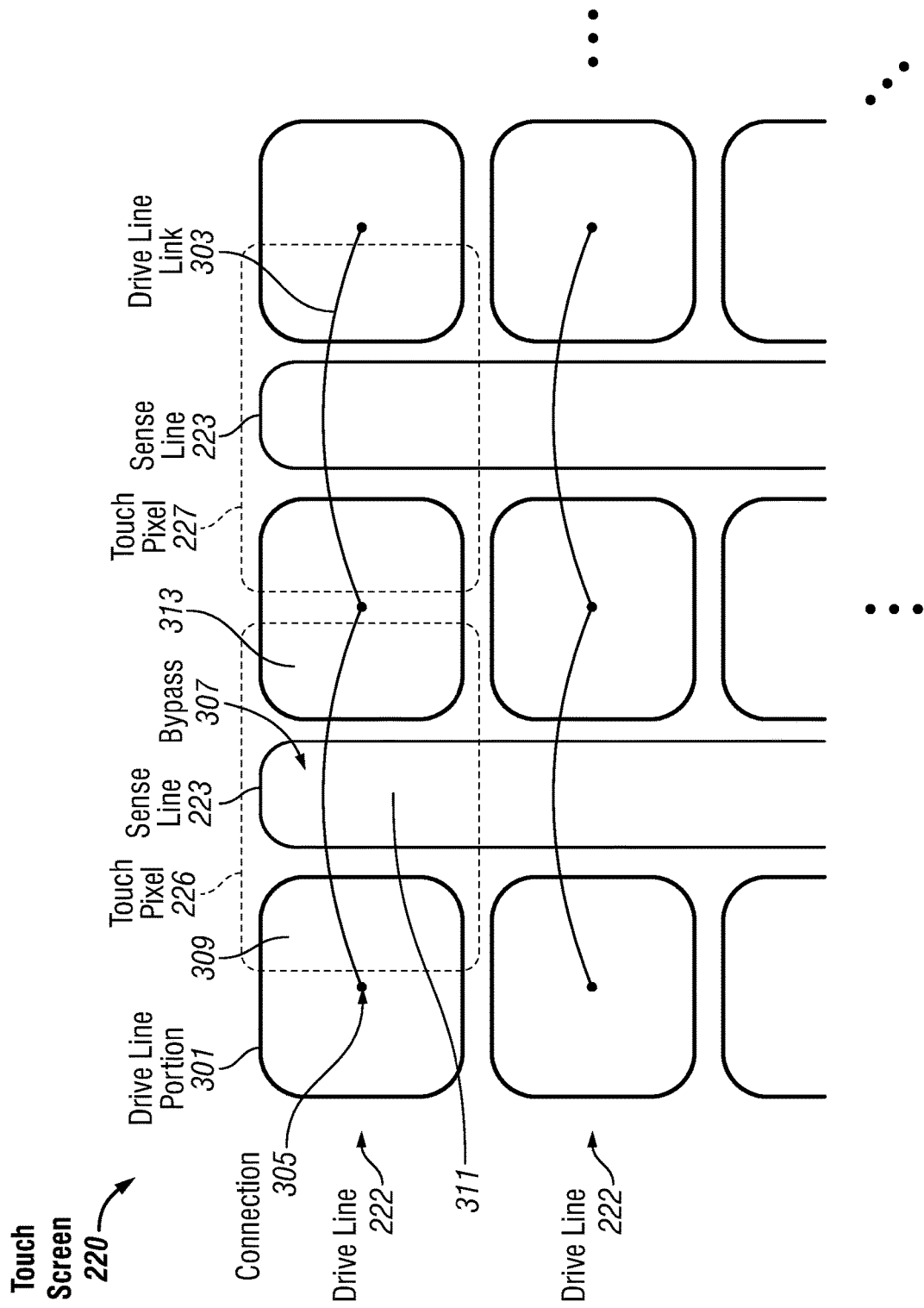
FIG. 3 is a more detailed view of the touch screen of FIG. 2 showing an example configuration of drive lines and sense lines according to embodiments of the disclosure.

In some example embodiments, touch screen 220 can be an integrated touch screen in which touch sensing circuit elements of the touch sensing system can be integrated into the display pixel stackups of a display. An example integrated touch screen in which embodiments of the disclosure can be implemented with now be described with reference to FIGS. 3-6. FIG. 3 is a more detailed view of touch screen 220 showing an example configuration of drive lines 222 and sense lines 223 according to embodiments of the disclosure. As shown in FIG. 3, each drive line 222 can be formed of one or more drive line segments 301 that can be electrically connected by drive line links 303 at connections 305. Drive line links 303 are not electrically connected to sense lines 223, rather, the drive line links can bypass the sense lines through bypasses 307. Drive lines 222 and sense lines 223 can interact capacitively to form touch pixels such as touch pixels 226 and 227. Drive lines 222 (i.e., drive line segments 301 and corresponding drive line links 303) and sense lines 223 can be formed of electrical circuit elements in touch screen 220. In the example configuration of FIG. 3, each of touch pixels 226 and 227 can include a portion of one drive line segment 301, a portion of a sense line 223, and a portion of another drive line segment 301. For example, touch pixel 226 can include a right-half portion 309 of a drive line segment on one side of a portion 311 of a sense line, and a left-half portion 313 of a drive line segment on the opposite side of portion 311 of the sense line.

Figure 4:
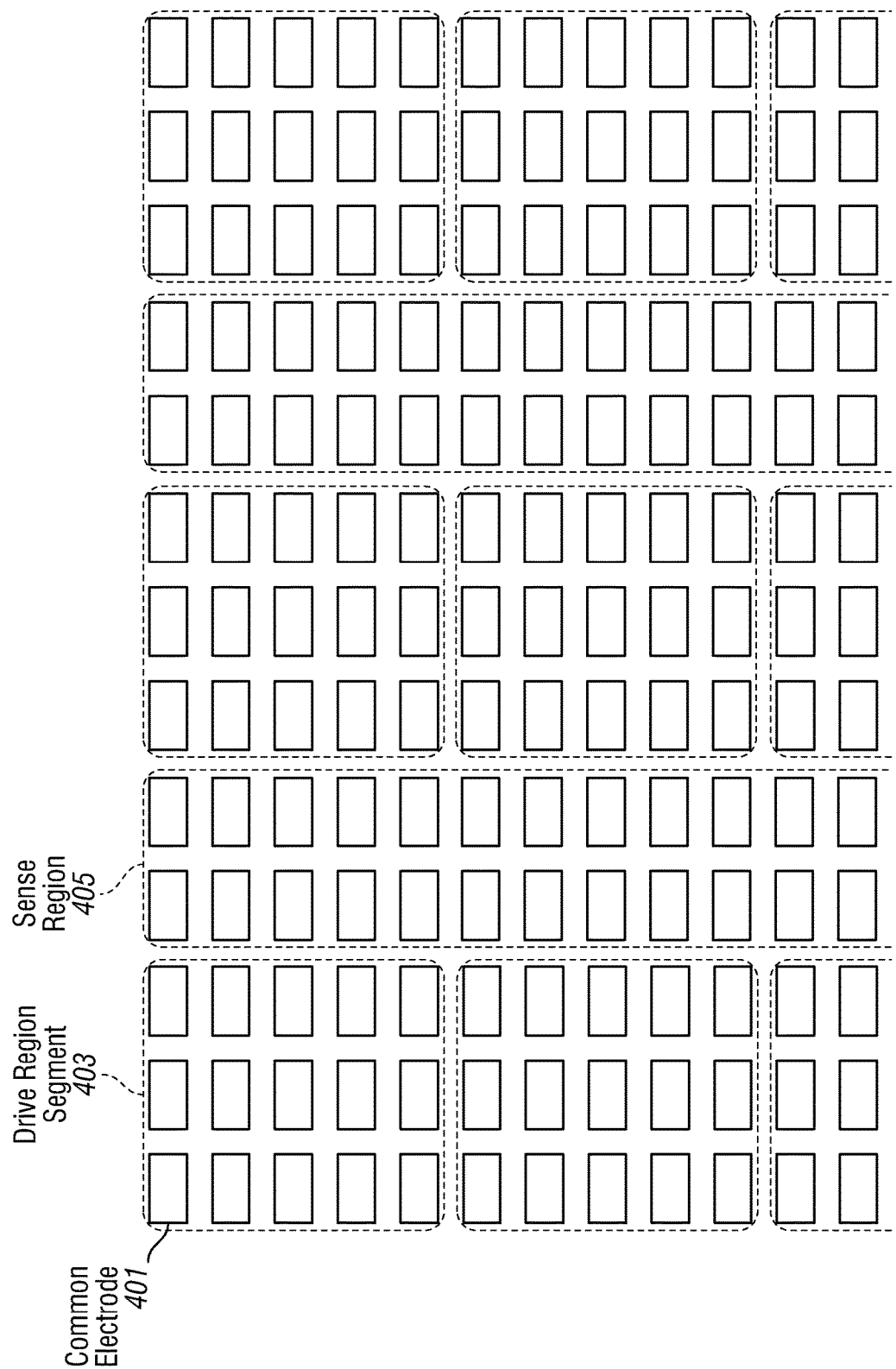
FIG. 4 illustrates an example configuration in which touch sensing circuitry includes common electrodes (Vcom) according to embodiments of the disclosure.

The circuit elements can include, for example, elements that can exist in conventional LCD displays, as described above. It is noted that circuit elements are not limited to whole circuit components, such as a whole capacitor, a whole transistor, etc., but can include portions of circuitry, such as only one of the two plates of a parallel plate capacitor. FIG. 4 illustrates an example configuration in which common electrodes (Vcom) can form portions of the touch sensing circuitry of a touch sensing system. Each display pixel includes a common electrode 401, which is a circuit element of the display system circuitry in the pixel stackup (i.e., the stacked material layers forming the display pixels) of the display pixels of some types of conventional LCD displays, e.g., fringe field switching (FFS) displays, that can operate as part of the display system to display an image.

In the example shown in FIG. 4, each common electrode (Vcom) 401 can serve as a multi-function circuit element that can operate as display circuitry of the display system of touch screen 220 and can also operate as touch sensing circuitry of the touch sensing system. In this example, each common electrode 401 can operate as a common electrode of the display circuitry of the touch screen, and can also operate together when grouped with other common electrodes as touch sensing circuitry of the touch screen. For example, a group of common electrodes 401 can operate together as a capacitive part of a drive line or a sense line of the touch sensing circuitry during the touch sensing phase. Other circuit elements of touch screen 220 can form part of the touch sensing circuitry by, for example, electrically connecting together common electrodes 401 of a region, switching electrical connections, etc. In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some embodiments, some of the circuit elements in the display pixel stackups can be multi-function circuit elements and other circuit elements may be single-function circuit elements. In other embodiments, all of the circuit elements of the display pixel stackups may be single-function circuit elements.

In addition, although example embodiments herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch phase may operate at different times. Also, although example embodiments herein describe certain circuit elements as being multi-function and other circuit elements as being single-function, it should be understood that the circuit elements are not limited to the particular functionality in other embodiments. In other words, a circuit element that is described in one example embodiment herein as a single-function circuit element may be configured as a multi-function circuit element in other embodiments, and vice versa.

For example, FIG. 4 shows common electrodes 401 grouped together to form drive region segments 403 and sense regions 405 that generally correspond to drive line segments 301 and sense lines 223, respectively. Grouping multi-function circuit elements of display pixels into a region can mean operating the multi-function circuit elements of the display pixels together to perform a common function of the region. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

Multi-function circuit elements of display pixels of the touch screen can operate in both the display phase and the touch phase. For example, during a touch phase, common electrodes 401 can be grouped together to form touch signal lines, such as drive regions and sense regions. In some embodiments circuit elements can be grouped to form a continuous touch signal line of one type and a segmented touch signal line of another type. For example, FIG. 4 shows one example embodiment in which drive region segments 403 and sense regions 405 correspond to drive line segments 301 and sense lines 223 of touch screen 220. Other configurations are possible in other embodiments; for example, common electrodes 401 could be grouped together such that drive lines are each formed of a continuous drive region and sense lines are each formed of a plurality of sense region segments linked together through connections that bypass a drive region.

The drive regions in the example of FIG. 3 are shown in FIG. 4 as rectangular regions including a plurality of common electrodes of display pixels, and the sense regions of FIG. 3 are shown in FIG. 4 as rectangular regions including a plurality of common electrodes of display pixels extending the vertical length of the LCD. In some embodiments, a touch pixel of the configuration of FIG. 4 can include, for example, a 64×64 area of display pixels. However, the drive and sense regions are not limited to the shapes, orientations, and positions shown, but can include any suitable configurations according to embodiments of the disclosure. It is to be understood that the display pixels used to form the touch pixels are not limited to those described above, but can be any suitable size or shape to permit touch capabilities according to embodiments of the disclosure.

Figure 5:
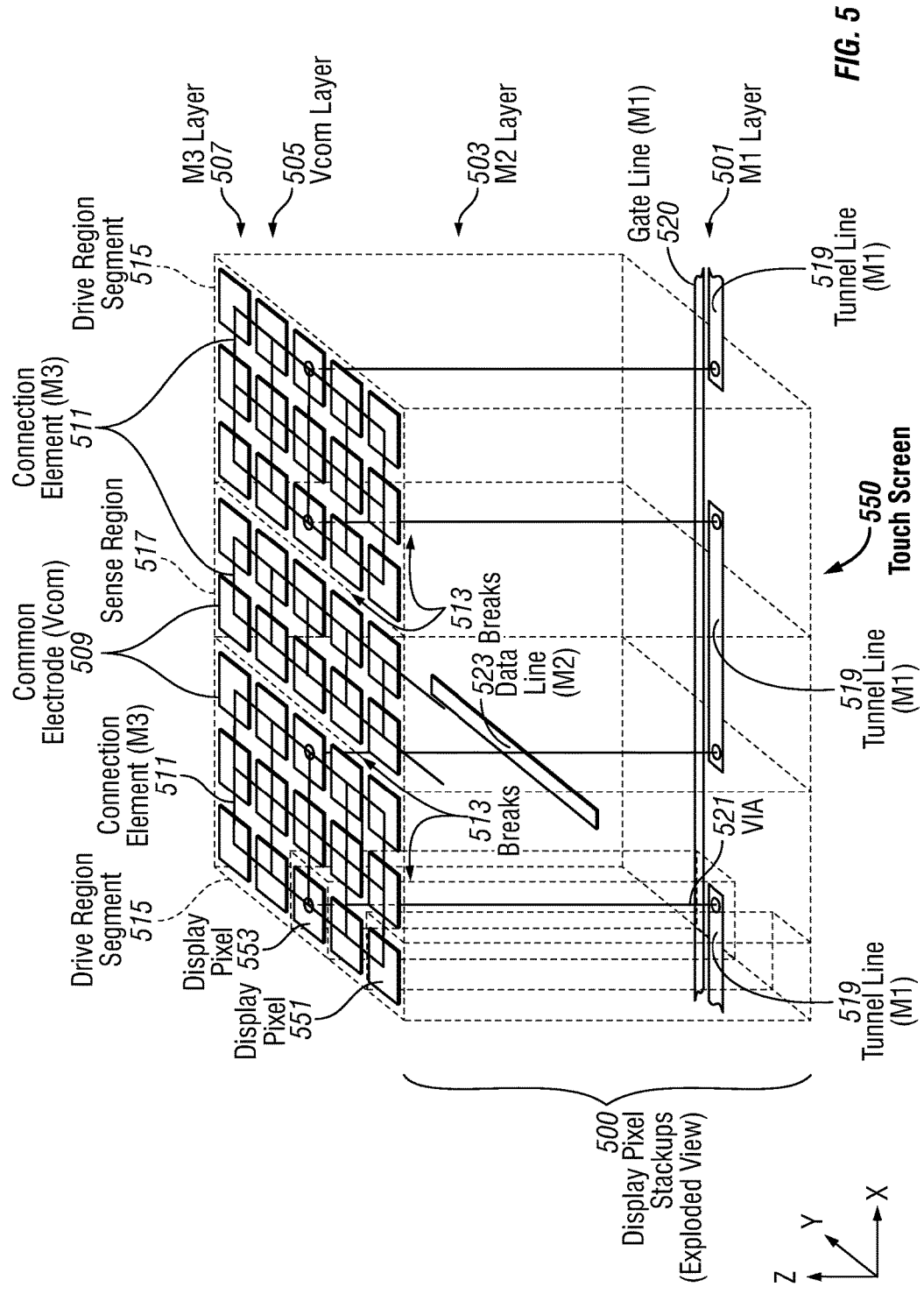
FIG. 5 illustrates an exploded view of example display pixel stackups according to embodiments of the disclosure.

FIG. 5 is a three-dimensional illustration of an exploded view (expanded in the z-direction) of example display pixel stackups 500 showing some of the elements within the pixel stackups of an example integrated touch screen 550. Stackups 500 can include a configuration of conductive lines that can be used to group common electrodes, such as common electrodes 401, into drive region segments and sense regions, such as shown in FIG. 4, and to link drive region segments to form drive lines.

Stackups 500 can include elements in a first metal (M1) layer 501, a second metal (M2) layer 503, a common electrode (Vcom) layer 505, and a third metal (M3) layer 507. Each display pixel can include a common electrode 509, such as common electrodes 401 in FIG. 4, that is formed in Vcom layer 505. M3 layer 507 can include connection element 511 that can electrically connect together common electrodes 509. In some display pixels, breaks 513 can be included in connection element 511 to separate different groups of common electrodes 509 to form drive region segments 515 and a sense region 517, such as drive region segments 403 and sense region 405, respectively. Breaks 513 can include breaks in the x-direction that can separate drive region segments 515 from sense region 517, and breaks in the y-direction that can separate one drive region segment 515 from another drive region segment. M1 layer 501 can include tunnel lines 519 that can electrically connect together drive region segments 515 through connections, such as conductive vias 521, which can electrically connect tunnel line 519 to the grouped common electrodes in drive region segment display pixels. Tunnel line 519 can run through the display pixels in sense region 517 with no connections to the grouped common electrodes in the sense region, e.g., no vias 521 in the sense region. The M1 layer can also include gate lines 520. M2 layer 503 can include data lines 523. Only one gate line 520 and one data line 523 are shown for the sake of clarity; however, a touch screen can include a gate line running through each horizontal row of display pixels and multiple data lines running through each vertical row of display pixels, for example, one data line for each red, green, blue (RGB) color sub-pixel in each pixel in a vertical row of an RGB display integrated touch screen.

Structures such as connection elements 511, tunnel lines 519, and conductive vias 521 can operate as a touch sensing circuitry of a touch sensing system to detect touch during a touch sensing phase of the touch screen. Structures such as data lines 523, along with other pixel stackup elements such as transistors, pixel electrodes, common voltage lines, data lines, etc. (not shown), can operate as display circuitry of a display system to display an image on the touch screen during a display phase. Structures such as common electrodes 509 can operate as multifunction circuit elements that can operate as part of both the touch sensing system and the display system.

For example, in operation during a touch sensing phase, gate lines 520 can be held to a fixed voltage while stimulation signals can be transmitted through a row of drive region segments 515 connected by tunnel lines 519 and conductive vias 521 to form electric fields between the stimulated drive region segments and sense region 517 to create touch pixels, such as touch pixel 226 in FIG. 2. In this way, the row of connected together drive region segments 515 can operate as a drive line, such as drive line 222, and sense region 517 can operate as a sense line, such as sense line 223. When an object such as a finger approaches or touches a touch pixel, the object can affect the electric fields extending between the drive region segments 515 and the sense region 517, thereby reducing the amount of charge capacitively coupled to the sense region. This reduction in charge can be sensed by a sense channel of a touch sensing controller connected to the touch screen, such as touch controller 206 shown in FIG. 2, and stored in a memory along with similar information of other touch pixels to create an "image" of touch.

Figure 6:
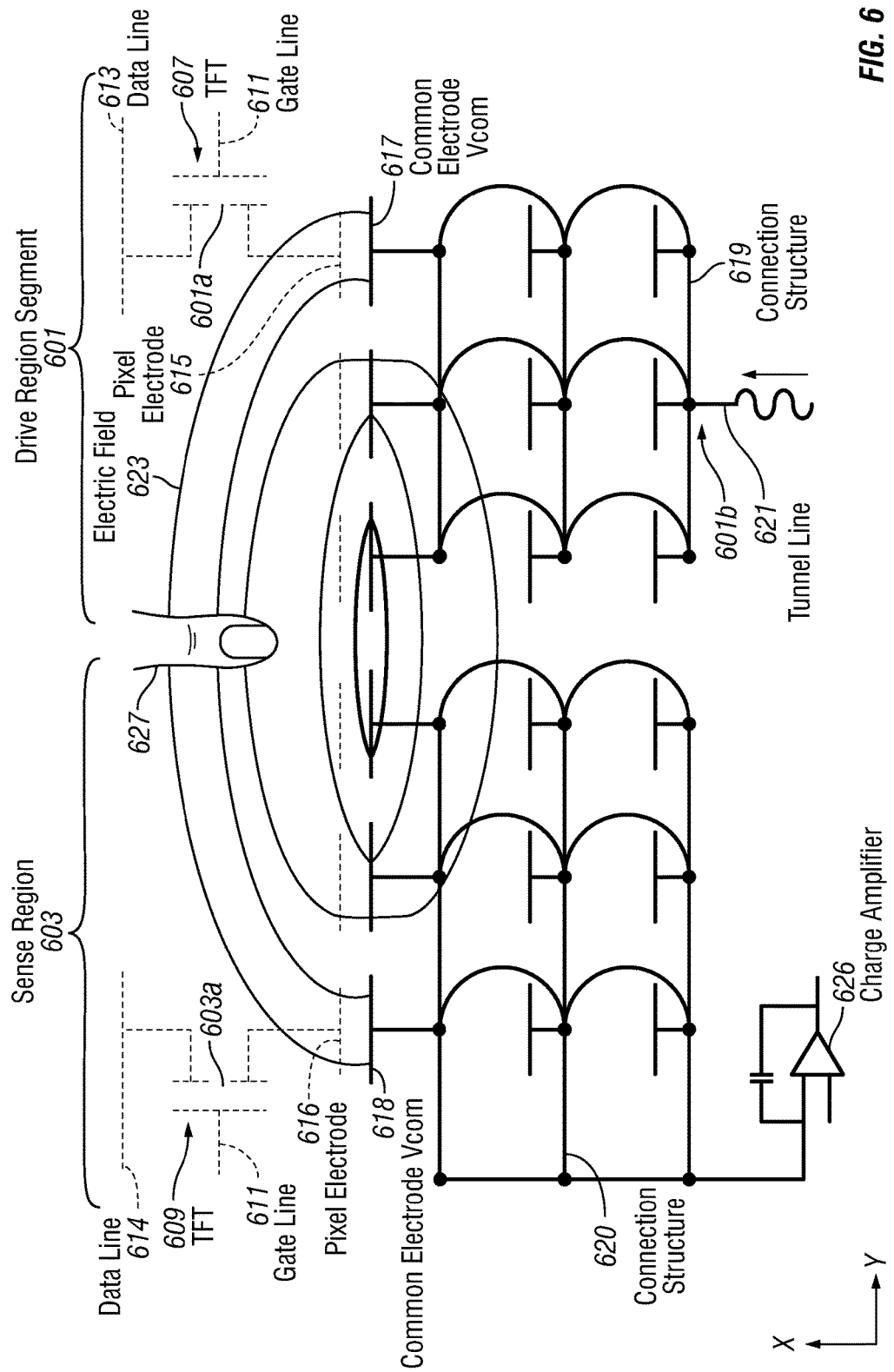
FIG. 6 illustrates an example touch sensing operation according to embodiments of the disclosure.

A touch sensing operation according to embodiments of the disclosure will be described with reference to FIG. 6. FIG. 6 shows partial circuit diagrams of some of the touch sensing circuitry within display pixels in a drive region segment 601 and a sense region 603 of an example touch screen according to embodiments of the disclosure. For the sake of clarity, only one drive region segment is shown. Also for the sake of clarity, FIG. 6 includes circuit elements illustrated with dashed lines to signify some circuit elements operate primarily as part of the display circuitry and not the touch sensing circuitry. In addition, a touch sensing operation is described primarily in terms of a single display pixel 601a of drive region segment 601 and a single display pixel 603a of sense region 603. However, it is understood that other display pixels in drive region segment 601 can include the same touch sensing circuitry as described below for display pixel 601a, and the other display pixels in sense region 603 can include the same touch sensing circuitry as described below for display pixel 603a. Thus, the description of the operation of display pixel 601a and display pixel 603a can be considered as a description of the operation of drive region segment 601 and sense region 603, respectively.

Referring to FIG. 6, drive region segment 601 includes a plurality of display pixels including display pixel 601a. Display pixel 601a can include a TFT 607, a gate line 611, a data line 613, a pixel electrode 615, and a common electrode 617. FIG. 6 shows common electrode 617 connected to the common electrodes in other display pixels in drive region segment 601 through a connection element 619 within the display pixels of drive region segment 601 that is used for touch sensing as described in more detail below. Sense region 603 includes a plurality of display pixels including display pixel 603a. Display pixel 603a includes a TFT 609, a data line 614, a pixel electrode 616, and a common electrode 618. TFT 609 can be connected to the same gate line 611 as TFT 607. FIG. 6 shows common electrode 618 connected to the common electrodes in other display pixels in sense region 603 through a connection element 620 that can be connected, for example, in a border region of the touch screen to form an element within the display pixels of sense region 603 that is used for touch sensing as described in more detail below.

During a touch sensing phase, gate line 611 can be connected to a power supply, such as a charge pump, that can apply a voltage to maintain TFTs 609 in the "off" state. Drive signals can be applied to common electrodes 617 through a tunnel line 621 that is electrically connected to a portion of connection element 619 within a display pixel 601b of drive region segment 601. The drive signals, which are transmitted to all common electrodes 617 of the display pixels in drive region segment 601 through connection element 619, can generate an electrical field 623 between the common electrodes of the drive region segment and common electrodes 618 of sense region 603, which can be connected to a sense amplifier, such as a charge amplifier 626. Electrical charge can be injected into the structure of connected common electrodes of sense region 603, and charge amplifier 626 converts the injected charge into a voltage that can be measured. The amount of charge injected, and consequently the measured voltage, can depend on the proximity of a touch object, such as a finger 627, to the drive and sense regions. In this way, the measured voltage can provide an indication of touch on or near the touch screen.

Referring again to FIG. 5, it can be seen from FIG. 5 that some display pixels of touch screen 550 include different elements than other display pixels. For example, a display pixel 551 can include a portion of connection element 511 that has breaks 513 in the x-direction and the y-direction, and display pixel 551 does not include tunnel line 519. A display pixel 553 can include a portion of connection element 511 that has a break 513 in the x-direction, but not in the y-direction, and can include a portion of tunnel line 519 and a via 521. Other display pixels can include other differences in the configuration of stackup elements including, for example, no breaks 513 in connection element 511, a portion of tunnel line 519 without a via 521, etc.

The proximity of various circuit elements of integrated touch screens, such as touch screen 550, can result in coupling of signals between different systems of the touch screen. For example, noise that is generated by power systems, such as a gate line system that applies voltage to gate lines of the touch screen during a touch sensing phase, can be coupled into the touch sensing system, which can potentially corrupt touch sensing signals.

Figure 7:
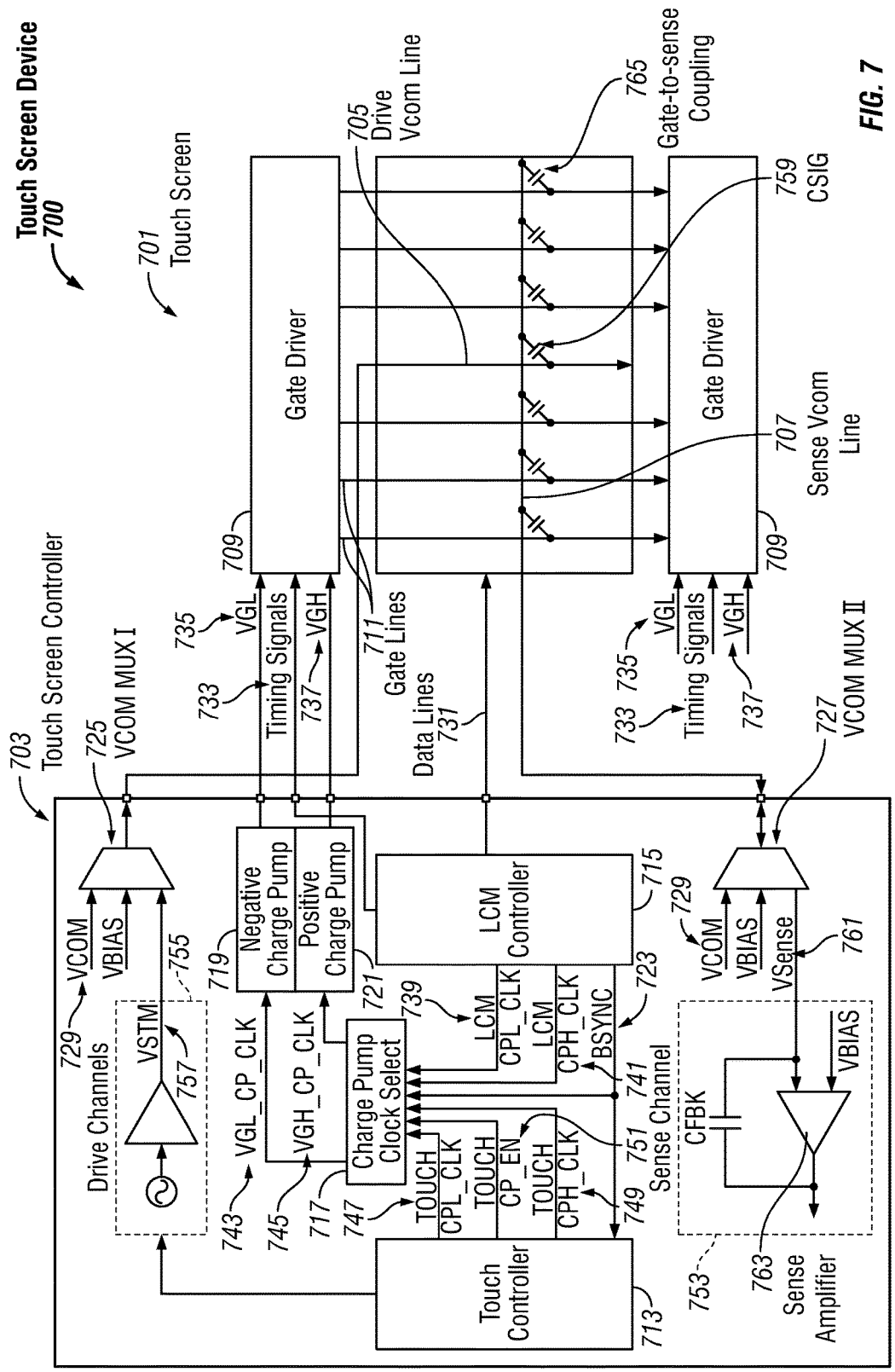
FIG. 7 illustrates an example touch screen device according to various embodiments.
Figure 8:
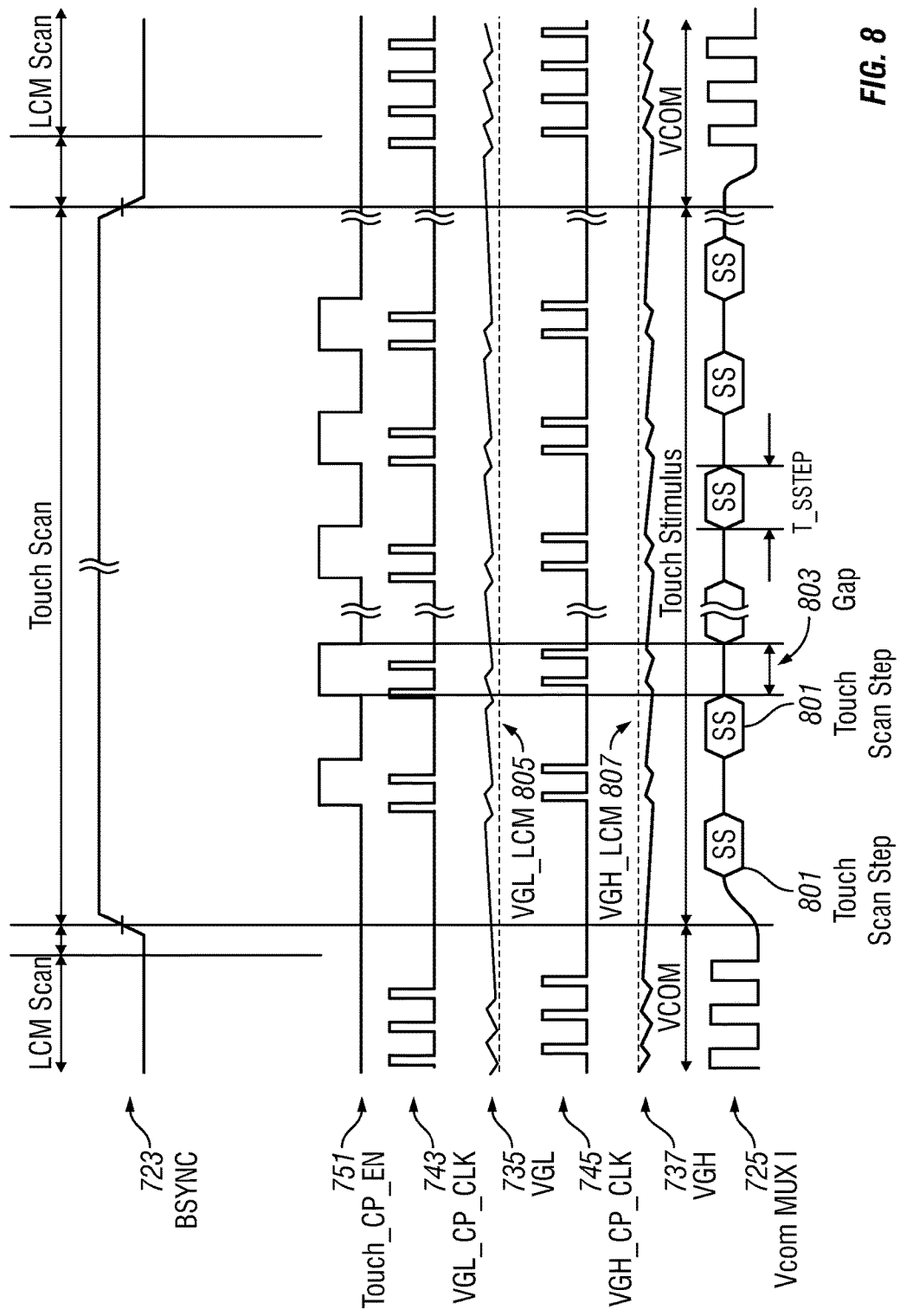
FIG. 8 illustrates an example power management method of a touch sensing system according to various embodiments.

FIGS. 7 and 8 illustrate an example touch screen device 700 and an example power management method, respectively, that can reduce or eliminate the effect of power system noise on a touch sensing system according to various embodiments. FIG. 7 illustrates a touch screen device 700, which can include a touch screen 701 and a touch screen controller 703. Touch screen 701 can be an integrated touch screen, such as touch screen 550, in which the common electrodes can operate as a common voltage source during a display phase and can operate as drive lines and sense lines during a touch sensing phase. For the sake of clarity, only one drive Vcom line 705 and on sense Vcom line 707 are illustrated in the figure. Touch screen 701 can also include gate drivers 709 and gate lines 711.

Touch screen controller 703 can be a combined touch and display controller, and can include both a touch controller 713, which can control the touch sensing operation of touch screen 701, and a display controller, such as LCM controller 715, which can control the display operation of the touch screen. In this regard, some of the components of touch screen controller 703 can be shared between LCM controller 715 and touch controller 713. For example, a charge pump system, including a charge pump clock selector 717, a negative charge pump 719, and a positive charge pump 721, can be used during both the display and touch phases, as described in more detail below. A synchronization signal (BSYNC) 723 between LCM controller 715 and touch controller 713 can be used to synchronize the display and touch sensing operations. For example, the display phase can correspond to a low BSYNC 723 signal, and the touch phase can correspond to a high BSYNC 723 signal.

During the display phase, a first Vcom multiplexer (VCOM MUX I) 725 and a second Vcom multiplexer (VCOM MUX II) 727 can connect the common electrodes (not shown) of touch screen 701 to a Vcom voltage source (not shown) controlled by LCM controller 715, thus allowing LCM controller 715 to apply a Vcom voltage (VCOM) 729 to the common electrodes. LCM controller 715 can update the image displayed on touch screen 701 by applying data voltages to data lines 731 while scanning through gate lines 711. LCM controller 715 can scan the gate lines using timing signals 733 to control gate drivers 709, and charge pump clock selector 717 can select the LCM controller to control negative charge pump 719 and positive charge pump 721 to apply a VGL 735 (low gate voltage) and a VGH 737 (high gate voltage) to gate lines 711 through gate drivers 709. Specifically, charge pump clock selector 717 can select signals LCM_CPL_CLK 739 and LCM_CPH_CLK 741 from LCM controller 715 as negative charge pump clock signal (VGL_CP_CLK) 743 and positive charge pump clock signal (VGH_CP_CLK) 745, respectively, to control negative charge pump 719 and positive charge pump 721. For the sake of clarity, a single charge pump system is shown in FIG. 7, although it is to be understood that a second charge pump system can be used to apply voltages to additional gate drivers 709 on an opposite side of touch screen 701, such that some gate lines 711 can be driven from one side of the touch screen and other gate lines 711 can be driven from the other side of the touch screen. In some embodiments, a positive and negative inductive boost regulator can be used instead of the positive and negative charge pump. In either example configuration, subsequent voltage regulators, such as low dropout regulators (LDOs), can be used to stabilize VGL and/or VGH rails. In this example embodiment, the pixel TFTs (not shown) can be switched off with VGL 735 (e.g., −10 V) and switched on with VGH 737 (e.g., +10 V). However, one skilled in the art would understand that different voltage levels can be used depending on, for example, the particular type transistor used for the pixel TFT.

During the touch sensing phase, the charge pump system can be used by touch controller 713. Specifically, charge pump clock selector 717 can select signals TOUCH_CPL_CLK 747 and TOUCH_CPH_CLK 749 from touch controller 713 as negative charge pump clock signal (VGL_CP_CLK) 743 and positive charge pump clock signal (VGH_CP_CLK) 745, respectively, to control negative charge pump 719 and positive charge pump 721, to apply VGL 735 and VGH 737 to gate lines 711 through gate drivers 709. In this example embodiment, all of the gate lines can be held at the low gate voltage in order to switch off all of the pixel TFTs during the touch sensing phase. In other words, VGL 735 can be applied to all of the gate lines during the touch sensing phase in the present example embodiment.

Touch controller 713 can also send a signal TOUCH_CP_EN 751 to charge pump clock selector 717 to select whether the charge pumps are enabled or disabled, as described in more detail below.

VCOM MUX II 727 can connect the common electrodes associated with each sense Vcom line 707 to a corresponding sense channel 753. Touch controller 713 can scan through the drive Vcom lines 705 by controlling VCOM MUX I 725 to connect the common electrodes associated with the drive Vcom lines to drive channels 755 in a particular scanning order while applying drive signals (VSTM) 757 to drive Vcom lines 705. Each drive signal 757 can be coupled to a sense Vcom line 707 through a signal capacitance (CSIG) 759 that can vary depending on the proximity of a touch object, such as a finger, resulting in a sense signal on the sense Vcom line. Touch controller 713 can receive sense signals (VSENSE) 761 from sense Vcom lines 707 through sense channels 753. Each sense channel 753 can include a sense amplifier 763 that amplifies sense signals 761. The amplified sense signals can be further processed by touch controller 713 to determine touches on touch screen 701.

However, applying VGL 735 to gate lines 711 can introduce noise into sense signals 761. For example, a parasitic gate-to-sense coupling 765 can exist between each gate line 711 and each sense Vcom line 707. Noise, such as voltage ripples, in VGL 735 can be coupled into sense Vcom lines 707 through gate-to-sense couplings 765. If the noise occurs while drive signals 757 are being applied and sense signals 761 are being received, the noise can be coupled into the sense signals and amplified by sense amplifier 763, possibly corrupting touch sensing results.

FIG. 8 illustrates an example power management timing method during the touch sensing phase of touch screen device 700 according to various embodiments. FIG. 8 shows an example timing of BSYNC 723, TOUCH_CP_EN 751, VGL_CP_CLK 743, VGL 735, VGH_CP_CLK 745, and VGH 737. FIG. 8 also illustrates the output of VCOM MUX I 725, which can be drive signals 757 during the touch sensing phase. In particular, touch screen 701 can be scanned using multiple touch scan steps 801 in a single touch sensing phase, with one or more drive signals 757 being applied during each touch scan step. During each touch scan step, touch controller 713 can set TOUCH_CP_EN to a low state, such that negative charge pump 719 and positive charge pump 721 are disabled. In other words, the charge pumps can be shut off during active touch sensing, which can help eliminate one source of noise in sense signals 761, such as voltage ripples in the charge pumps that might have otherwise been coupled into the sense signals.

In between touch scan steps 801, touch controller 713 can suspend the application of drive signals 757, i.e., suspend active touch sensing, and can set TOUCH_CP_EN to a high state to enable the charge pump clocks and therefore allow the charge pumps to restore VGL and VGH voltage levels, which may have drooped toward ground during touch scanning. It should be understood that the charge pump voltages can still be supplied even during touch scanning, and that the charge pump voltages may have drooped toward ground during touch scanning. Setting TOUCH_CP_EN to a high state can allow charge pumps to switch and restore the VGL/VGH voltage levels. In this way, for example, the voltage on gate lines 711 can be maintained at an acceptable level throughout the touch sensing phase by activating the charge pumps during the gaps 803 in between touch scan steps 801 to correct any drops in the voltages on gate lines 711 that may occur while the charge pumps are disabled during the touch scan steps.

Figure 14:
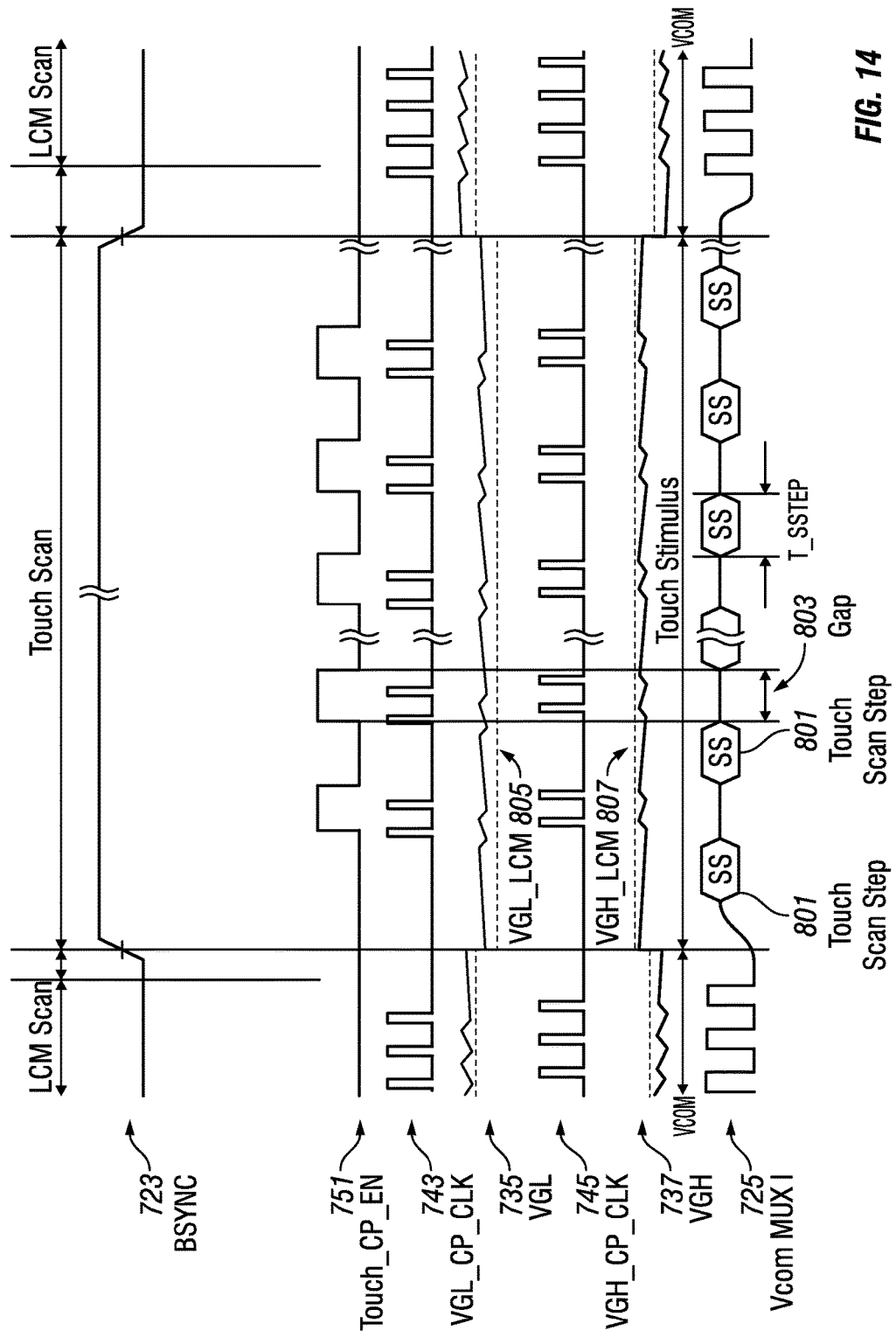
FIG. 14 illustrates an example power management method of a touch sensing system according to various embodiments.

In this regard, during each gap 803 in between touch scan steps 801, touch controller 713 can control the negative and/or positive charge pumps, as needed, to apply voltage to the gate lines to maintain desired gate line voltage levels. In the example illustrated in FIG. 8, two clock transitions can occur on signal VGL_CP_CLK 743 to the negative charge pump 719 to restore the VGL 735 voltage level that is applied to the gate driver. Likewise, two clock transitions can occur on signal VGH_CP_CLK 745 to restore VGH 737 voltage levels to the gate driver. The number of clock transitions on VGL_CP_CLK and VGH_CP_CLK can be, for example, a function of the load current drawn from VGL and VGH. The voltage levels of VGL 735 and VGH 737 illustrated in FIG. 8 show how the voltage levels can be affected by periodically clocking negative charge pump 719 and positive charge pump 721, respectively. Referring to the VGL level, for example, at times when clock transitions on VGL_CP_CLK are not occurring the voltage level of VGL can droop toward ground and away from the desired voltage level due to, for example, load current imposed on VGL by the gate driver. In some embodiments, touch controller 713 can boost the gate voltages such that the voltage levels of VGL 735 and VGH 737 that are applied during the touch sensing phase are lower than the corresponding voltage magnitudes applied during the display phase. In some embodiments, touch controller 713 can boost the gate voltages such that the magnitudes of the voltage levels of VGL 735 and VGH 737 that are applied during the touch sensing phase are greater than the corresponding voltage magnitudes applied during the display phase, as illustrated in FIG. 14.

When negative charge pump 719 is clocked by VGL_CP_CLK 743, the level of VGL 735 and therefore the voltage on gate lines can be restored to the VGL_LCM 805 voltage level. Likewise, when positive charge pump 721 is clocked by VGH_CP_CLK 745, the level of VGH 737 can be restored to the VGL_LCM 807 voltage level. In some cases, noise generated by negative charge pump 719 can affect touch sensing, such as by causing disturbance on the output of the sense amplifier. These disturbances can continue after the charge pump is disabled due to, for example, the finite settling time of the sense amplifier. In some embodiments, post-noise stabilizing can be applied to reduce or eliminate disturbances. For example, sense amplifier disturbances can be reduced or eliminated by shorting the sense amplifier's feedback network to reset the sense amplifier.

Figure 9:
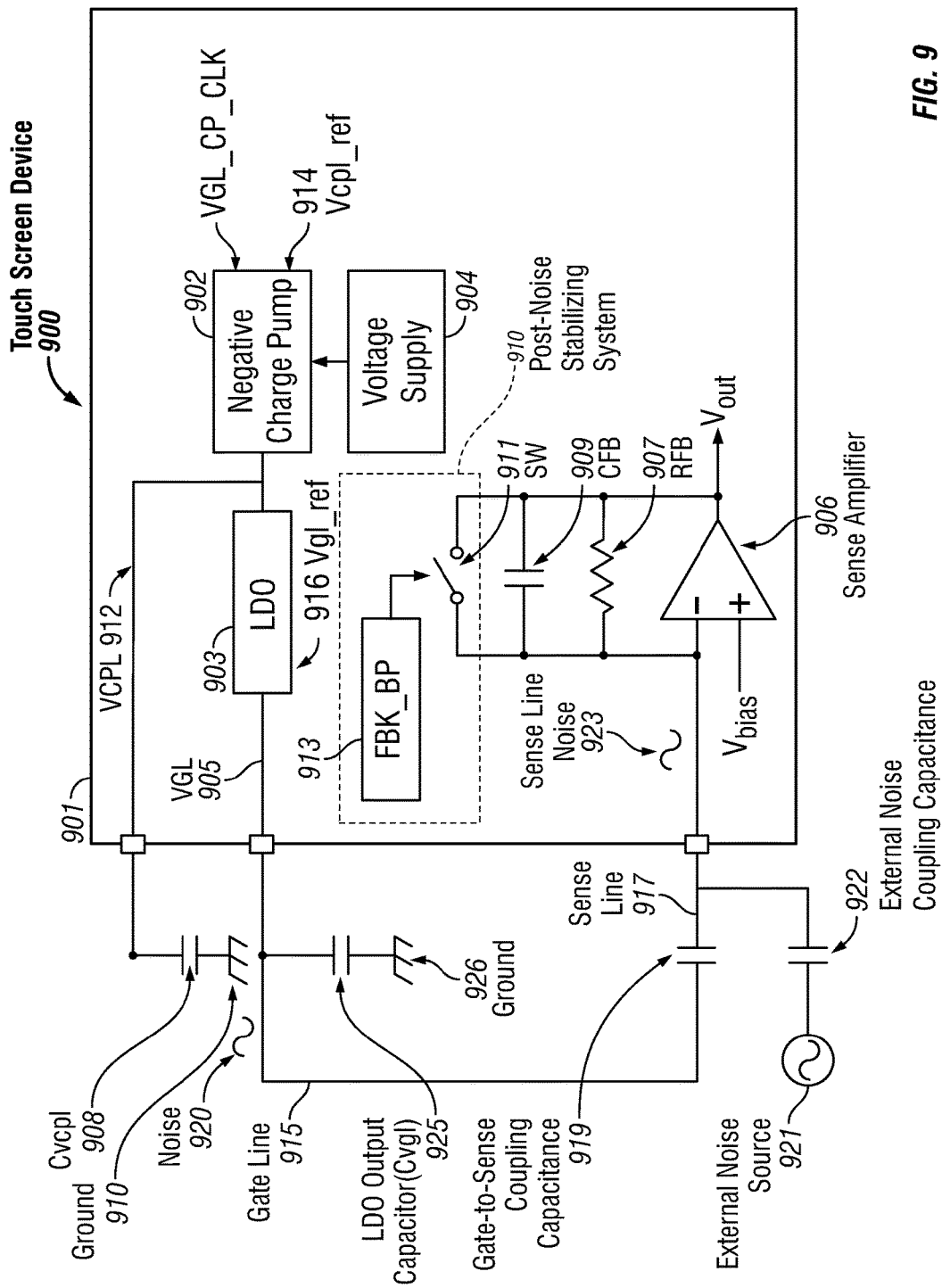
FIG. 9 is a diagram of circuit portion of an example touch screen device according to various embodiments.

FIG. 9 is a more detailed diagram of circuit portion of an example touch screen device 900 according to various embodiments of the disclosure. The circuit portion of touch screen device 900 illustrates elements of a noise coupling mechanism, such as described above, that can couple noise on the gate lines into the touch sensing system. For the sake of clarity, other elements of touch screen device 900 have been omitted from FIG. 9. Touch screen device 900 can include a touch screen controller 901 that can be, for example, a combined touch and display controller, such as touch screen controller 703 above. Touch screen controller 901 can include a negative charge pump 902, a voltage regulator, such as a negative low dropout regulator (LDO) 903, which can keep a gate line voltage (VGL) 905 level stable regardless of the state of the charge pump. Negative charge pump 902 can have an output capacitor Cvcpl 908, which can be connected to a ground 910. During touch scanning, an output voltage of the negative charge pump (VCPL) 912 can droop toward ground due to the gate drivers sinking current into Cvcpl 908. The amount of droop can be dependent on the magnitude of the load current. In between touch scans, negative charge pump 902 can be enabled and can restore the VCPL 912 level to a desired charge pump voltage level for the touch phase, VCPL_TOUCH. The LDO can be powered by VCPL 912 and can provide a stable output voltage VGL, which can equal the VGL_TOUCH voltage level, while rejecting the noise on VCPL. Vcpl_ref 914 can be the reference voltage for negative charge pump 902 and can control the VCPL 912 voltage level. Vgl_ref 916 can be the reference voltage for negative LDO 903 and can control the VGL 905 voltage level. Vcpl_ref 914 can be adjusted such that the negative charge pump voltage level VCPL 912 is above the VGL 905 voltage level such that negative LDO 903 remains in regulation. The difference between VCPL 912 and VGL 905, that is, the difference between the voltage into negative LDO 903 and the output voltage of the negative LDO, can be dependent on the minimum dropout voltage requirement Vdo_ldo for the negative LDO, the charge pump inactivity Tcp_off and the VGL supply current Ivgl. The difference between VCPL 912 and VGL 905 is referred to as over voltage (Vdo) and is defined as:

$$Vdo=Vdo\_ldo+Ivgl*Tcp\_off/Cvcpl.$$

The last term in the equation is the amount of voltage change across Cvcpl 908 due to current into the output capacitor from the gate drivers.

Touch screen controller 901 can also include a sense amplifier 906 that can include a feedback resistor (RFB) 907 and a feedback capacitor (CFB) 909. Touch screen controller 901 can include a post-noise stabilizing system 910 that can include a feedback bypass switch (SW) 911, which can be connected in parallel with feedback resistor 907 and feedback capacitor 909, and a feedback bypass controller (FBK_BP) 913 that can control feedback bypass switch 911 to short the feedback loop of sense amplifier 906, as described in more detail below. In some embodiments, feedback bypass controller 913 can be included in a touch controller (not shown) of touch screen controller 901, for example.

FIG. 9 shows some elements of a touch screen of touch screen device 900, including a gate line 915 and a sense line 917. Sense line 917 can include, for example, a sense Vcom line, such as described above in reference to FIG. 7. A gate-to-sense coupling capacitance 919 between gate line 915 and sense line 917 can couple noise 920 on the gate line, such as noise from negative LDO 903, into the sense line. Gate-to-sense coupling capacitance 919 can result from, for example, the structural configuration and material composition of gate line 915 and sense line 917, the structures and materials of other circuit structures, the particular mode of operation of one or more circuit elements of the touch screen device, etc. FIG. 9 also shows an external noise source 921, which can generate external noise that can be coupled into sense line 917 by an external noise coupling capacitance 922.

The noise, Vnz_o, on the output of the sense amplifier due to the noise, Vnz, on VGL coupled through the gate-to-sense line capacitance, Cvs, into the sense amplifier can be defined as: Vnz_o=Vnz*Gvs. Gvs is the noise gain of the sense amplifier from VGL to the output of the sense amplifier and is defined as: Gvs=−Cvs/Cfb. Vnz_o can include in-band components, i.e., that occur within the demodulation bandwidth of the touch subsystem, and/or include out-of-band components. Out-of-band noise components can be detrimental to touch performance and can take up dynamic output range in the sense amplifier, therefore limiting the amount of external noise the sense amplifier can accommodate. For example, the sense amplifier can have a dynamic output range of 4 Vpp. The touch signal can take up 1 Vpp, and therefore can occupy 25% of the sense amplifier output range. This can leave 75% of the sense amplifier's output range for external noise. Thus, for example, if the noise gain, Gvs, is 25V/V and the residual noise on VGL is 40 mV, the VGL noise component would take up (25V/V×0.04 Vpp)=1 Vpp in the output of the sense amplifier, therefore reducing the sense amplifier's output range for external noise from 75% to 50%. It is therefore beneficial to utilize LDO 903 to reduce any noise induced by the charge pump.

When negative charge pump 902 is off, external noise source 921 and LDO 903 may be the sole source of noise into the sense amplifier due to gate-to-sense coupling capacitance Cvs 919. However, while negative charge pump 902 is operating (as illustrated in FIG. 9), sense line noise 923 can also include residual charge pump noise, due to finite power supply rejection of LDO, for example.

As explained above, the VGL voltage levels during touch phase and display phase can be different. In some embodiments, it can be advantageous to lower the VGL voltage level during touch phase, which can reduce or eliminate cross talk between the display system and the touch sensing system. In order to increase touch integration time (i.e., reducing integration bandwidth and therefore increasing touch signal-to-noise ratio), it can be advantageous to reduce the time it takes for the VGL voltage level to settle from VGL_LCM to VGL_TOUCH after entering touch phase upon the rising edge of BSYNC, where VGL_LCM is the VGL voltage level during display phase and VGL_TOUCH is the VGL voltage level during touch phase. Typically, the charge pump settling time can be longer than the duration of touch phase and therefore may greatly exceed the settling time needed to charge VGL from VGL_LCM to VGL_TOUCH in the desired time. Therefore, it can be advantageous to rely on the charge transfer from Cvcpl 908 to an LDO output capacitor Cvgl 925 to quickly charge Cvgl to the VGL_TOUCH voltage level.

Figure 12A:
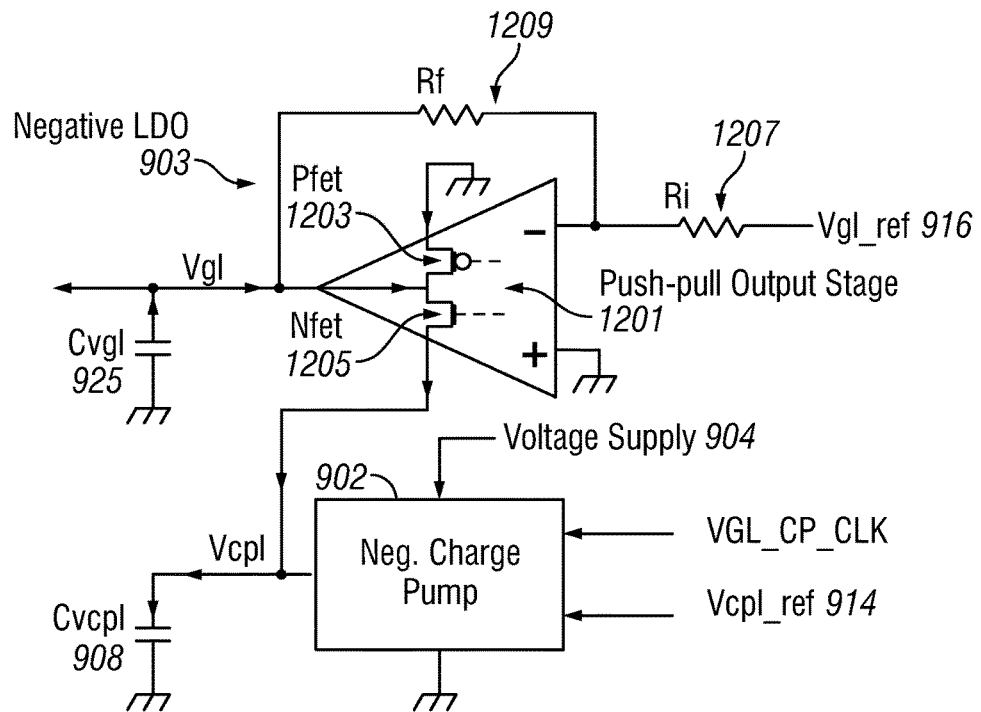
FIGS. 12A and 12B illustrate an example transition from display phase to touch phase and an example transition from touch phase to display phase according to various embodiments.
Figure 12B:
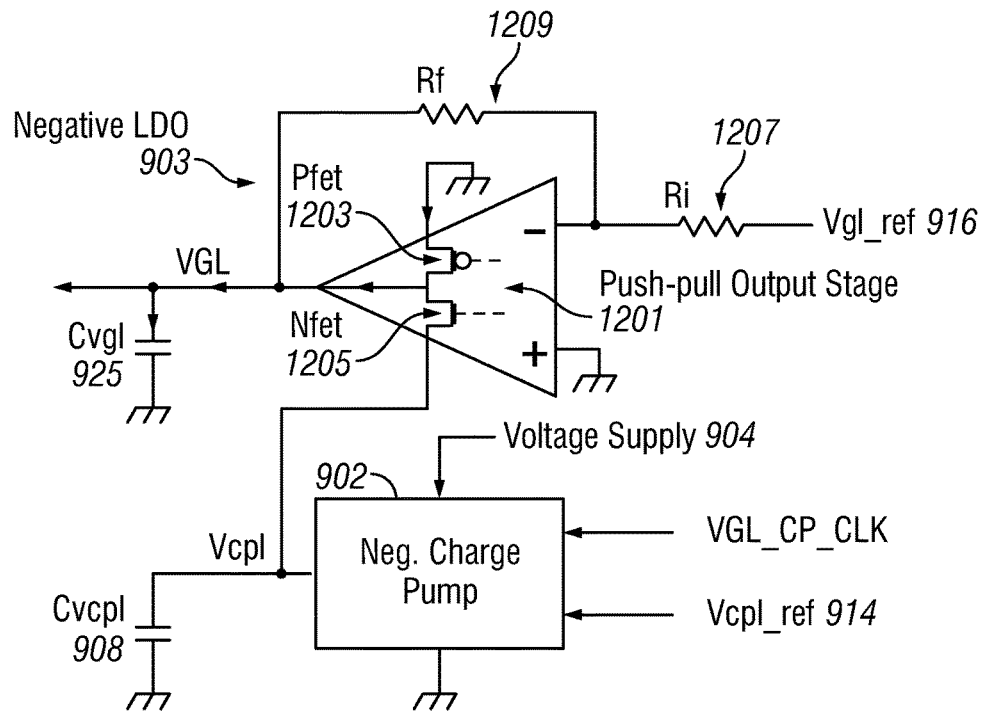

FIGS. 12A and 12B show a more detailed view of example negative LDO 903 and the current flow out of and into Cvgl 925 during transition from display phase to touch phase (illustrated in FIG. 12A) and transition from touch phase to display phase (illustrated in FIG. 12B) according to various embodiments. Negative LDO 903 can have a push-pull output stage 1201 including of a P-channel FET (field effect transistor) 1203 and an N-channel FET 1205. The gain of negative LDO 903 can be set by a feedback network including an input resistor Ri 1207 and a feedback resistor Rf 1209. In this example, the output voltage of the negative LDO is: VGL=−Vgl_ref*Rf/Ri.

Referring now to FIG. 12A, during the transition from display phase to touch phase, Vgl_ref 916 can transition from a first voltage level to a second voltage level, where the second voltage level can typically be higher than the first voltage level. This can cause N-channel FET 1205 in push-pull output stage 1201 to conduct, which can result in charge being transferred from Cvgl 925 to Cvcpl 908 (indicated in FIG. 12A by arrowed lines along the path from Cvgl to Cvcpl), therefore lowering the VGL voltage level from VGL_LCM to VGL_TOUCH. In order to maintain a touch drop-out voltage requirement, Vdo_touch, charge pump reference voltage Vcpl_ref 914 can be adjusted accordingly. A settling time, Tsettle, (described in more detail below in reference to FIG. 13) can depend on the sizes of capacitors Cvgl 925 and Cvcpl 908, the amount of overcharge Vdo, and the ON resistance, RON, of N-channel FET 1205. In some embodiments, two parallel N-channel FETs can be used, a first N-channel FET that can be always active and a second N-channel FET that can be enabled only during the settling phase during the transition from touch phase to display phase. The second N-channel FET can be used to lower the impedance between Cvgl and Cvcpl as to speed up settling of VGL to the VGL_TOUCH voltage level upon transition from the display phase to the touch phase.

Referring to FIG. 12B, during the transition from touch phase to display phase, Vgl_ref 916 can transition from a first voltage level, VGL_TOUCH, to a second voltage level, VGL_LCM, where the second voltage level can typically be higher than the first voltage level. This can cause P-channel FET 1203 in push-pull output stage 1201 of negative LDO 903 to conduct, which can result in charge being transferred from ground to Cvgl 925 (indicated in FIG. 12B by arrowed lines along the path from ground to Cvgl). In order to maintain a LDO drop-out requirement, Vdo_lcm, the charge pump reference voltage Vcpl_ref 914 can be adjusted accordingly. In this example embodiment, the settling time can be largely dependent on Cvgl 925 and the ON resistance of P-channel FET 1203.

Figure 13:
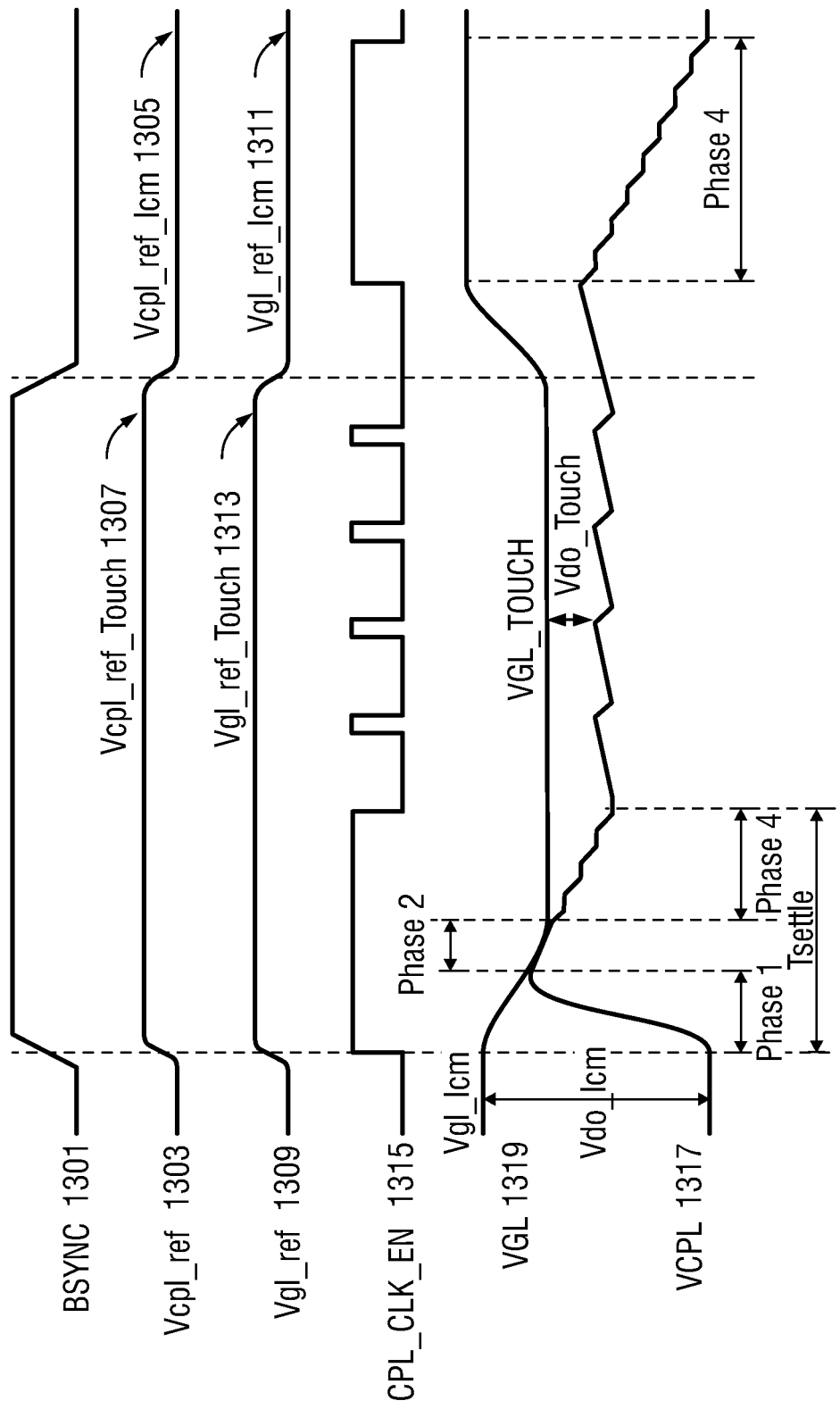
FIG. 13 shows an example timing diagram for an example charge and discharge process according to various embodiments.

FIG. 13 shows an example timing diagram for an example VGL charge and discharge process according to various embodiments. Upon rising edge of a BSYNC signal 1301, a charge pump reference voltage, Vcpl_ref 1303, can transition from a first voltage level, Vcpl_ref_lcm 1305, to a second voltage level, Vcpl_ref_touch 1307, and an LDO reference voltage, Vgl_ref 1309, can transition from a first voltage level, Vgl_ref_lcm 1311, to a second voltage level, Vgl_ref_touch 1313. A charge pump enable signal, CP_CLK_EN 1315, can be HIGH, which can cause the negative charge pump to draw current from Cvcpl 908, in order to lower an output voltage level of the charge pump, VCPL 1317, to a desired charge pump voltage level for the touch phase, VCPL_TOUCH, according to the new voltage level of charge pump reference voltage, Vcpl_ref_touch 1307. As illustrated in FIG. 13, during a phase 1 an output voltage level of the LDO, VGL 1319, can drop rapidly due to the charge transfer from Cvgl to Cvcpl via N-channel_FET (as described above, for example). Negative charge pump 902 can contribute little to the change in VGL level. At the end of phase 1, an equilibrium point can be reached where VGL=VCPL and VGL>VGL_TOUCH. During a phase 2, both VCPL 1317 and VGL 1319 can be lowered. The transition between phase 2 and a phase 3 can occur when VCPL=VGL=VGL_TOUCH+Vdo, at which time negative LDO 902 can start regulating the VGL voltage level. In phase 3, VGL 1319 voltage level can remain at VGL_TOUCH while negative charge pump 902 decreases VCPL 1317 voltage level until VCPL=VCPL_TOUCH= VGL_TOUCH+Vdo_touch. Depending on the overcharge level, Vdo_lcm, phase 1 may directly transition to phase 3, that is, VGL 1319 can already be charged to VGL_TOUCH at the end of phase 1.

Upon the falling edge of BSYNC signal 1301, reference voltage Vcpl_ref 1303 into the charge pump can transition from Vcpl_ref_touch 1307 to Vcpl_ref_lcm 1305, and reference voltage Vgl_ref 1309 into the negative LDO can transition from Vgl_ref_touch 1313 to Vgl_ref_lcm 1311. Signal CP_CLK_EN 1315 can be HIGH, which can cause negative charge pump 902 to draw current from Cvcpl in order to lower the VCPL 1317 voltage level to VCPL_LCM, according to the new voltage level of negative charge pump reference voltage, Vcpl_ref_lcm 1305. During a phase 4, VGL 1319 voltage level can increase rapidly toward ground due to the charge transfer from ground to Cvgl via P-channel_FET in the negative LDO (as described above, for example). Because the display phase can be longer than the touch phase, for example, in some embodiments the display phase can be as much as three times longer than the touch phase, VCPL 1317 can be overcharged sufficiently during display phase to achieve fast settling during a settling time, Tsettle 1321, during the transition from a display to a touch phase.

In some embodiments, VGH and VCPH may be adjusted in a similar way as described above, for example, in which VGH during touch mode can have a voltage level VGH_TOUCH, VGH during display mode can have a voltage level VGH_LCM, and VGH_TOUCH can be lower than VGH_LCM. In some embodiments, for example, a positive LDO can discharge a capacitance Cvgh through an N-channel FET to ground upon a rising edge of a BSYNC signal to lower the VGH voltage level, and a P-channel FET can transfer charge from a capacitance Cvcph to Cvgh upon a falling edge of the BSYNC signal as to increase the VGH voltage level. In some embodiments, VGH and VGL can be adjusted together as to maintain the same voltage differential (e.g., VGH_TOUCH-VGL_TOUCH~VGH_LCM-VGL_LCM) in the touch phase and the display phase, as to operate within the voltage limits tolerable by other components of the system, such as a gate driver. It should also be understood, that different combinations of voltage levels for VCPH, VGH, etc., are possible and that all voltage levels can be programmable, as needed by a given application. In some embodiments, in which VGH and VGL can be adjusted together, that is, VGL and VGH can be lowered during transition from display-to-touch-phase and where VGL and VGH can be increased during transition from touch-to-display phase, charge from Cvcph and Cvgh can be recycled to Cvcpl and Cvgl upon transition from display phase to touch phase, and charge from Cvcpl and Cvgl can be recycled to Cvcph and Cvgh during the transition from touch phase to display phase, which can, for example, yield power savings.

Figure 10:
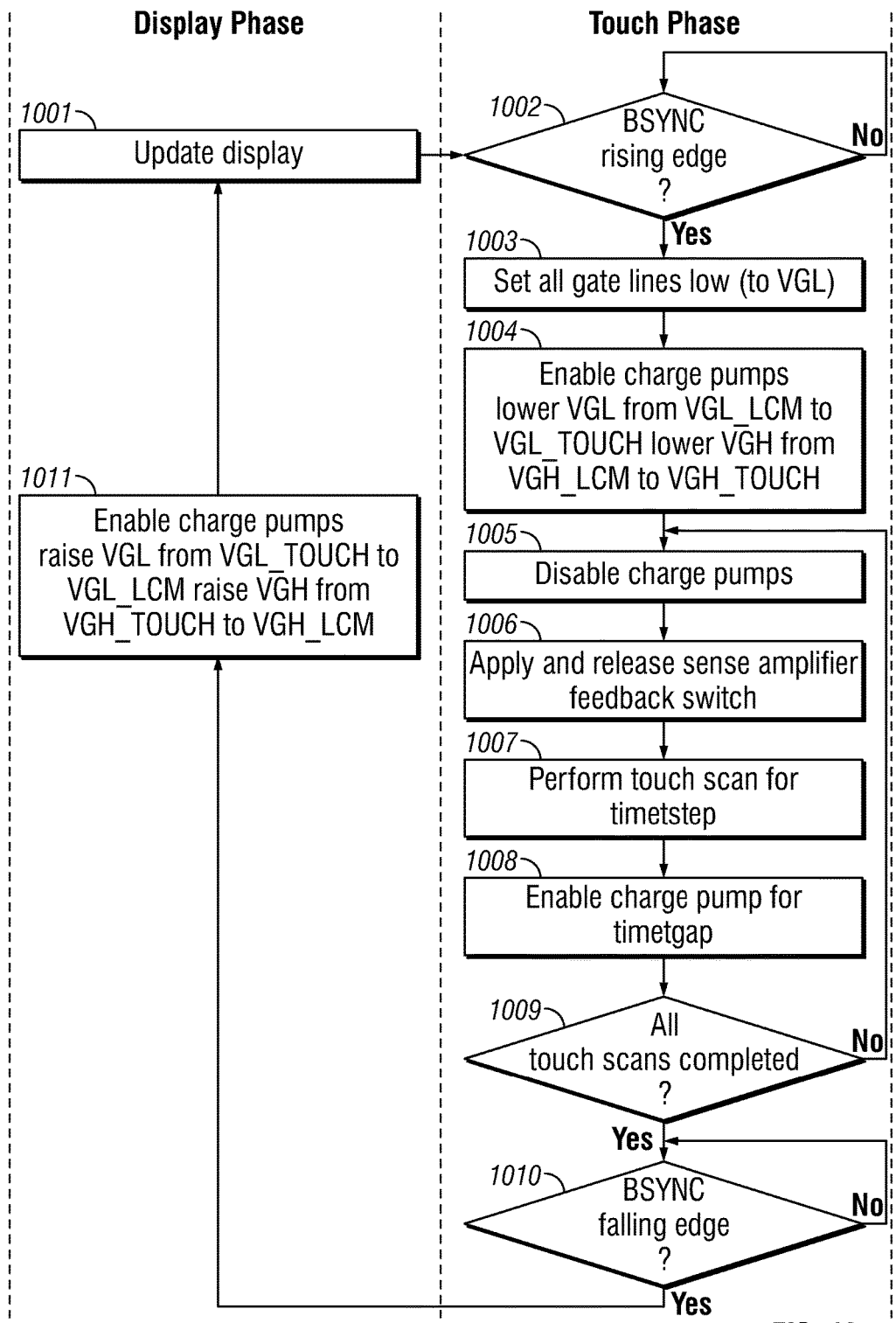
FIG. 10 is a flowchart of an example operation of a touch screen device according to various embodiments.

FIG. 10 is a flowchart of an example operation of a touch screen device, such as touch screen device 900, according to various embodiments of the disclosure. Reference to touch screen device 900 is made to illustrate one example implementation of the example operation of FIG. 10. During a display phase, an image can be updated (1001) on a touch screen of the device. A rising edge of a BSYNC signal can be detected (1002), and a touch sensing phase can be performed in response, for example, during a blanking period of the touch screen after the updating of the display. In the touch sensing phase, all gate lines can be set (1003) LOW to disable the display TFTs. Setting the gate lines LOW, essentially can pull the gate lines to the negative gate drive supply voltage VGL, which can be, for example, an output voltage of a negative LDO as described above. The charge pumps can be enabled (1004). VGL and VGH voltage levels can be lowered (1005) from VGL_LCM and VGH_LCM to VGL_TOUCH and VGH_TOUCH, for example, by using the example charge transfer mechanism described above. After the charge pumps are disabled, the sense amplifier feedback switch can be applied and released (1006) a certain time later to speed up settling prior to the first touch scan. The touch sensing scan can be performed (1007) for a time, TSCAN. After the touch sensing scan, the charge pumps can be enabled (1008) for a time, TGAP, to restore the VGL and VGH voltage levels to the desired levels VGL_TOUCH and VGH_TOUCH. If all touch scans are completed (1009) and after a falling edge of the BSYNC signal is detected (1010), the charge pumps can be enabled (1011), and VGL and VGH voltage levels can be raised from VGL_TOUCH and VGH_TOUCH to VGL_LCM and VGH_LCM, for example, by using the example charge transfer mechanism described above in preparation for the next display update. At 1009, if all touch scans are not completed, the process can again disable (1005) the charge pumps and apply and release (1006) the sense amplifier feedback switch for quick settling in preparation for the next touch sensing scan.

Figure 11:
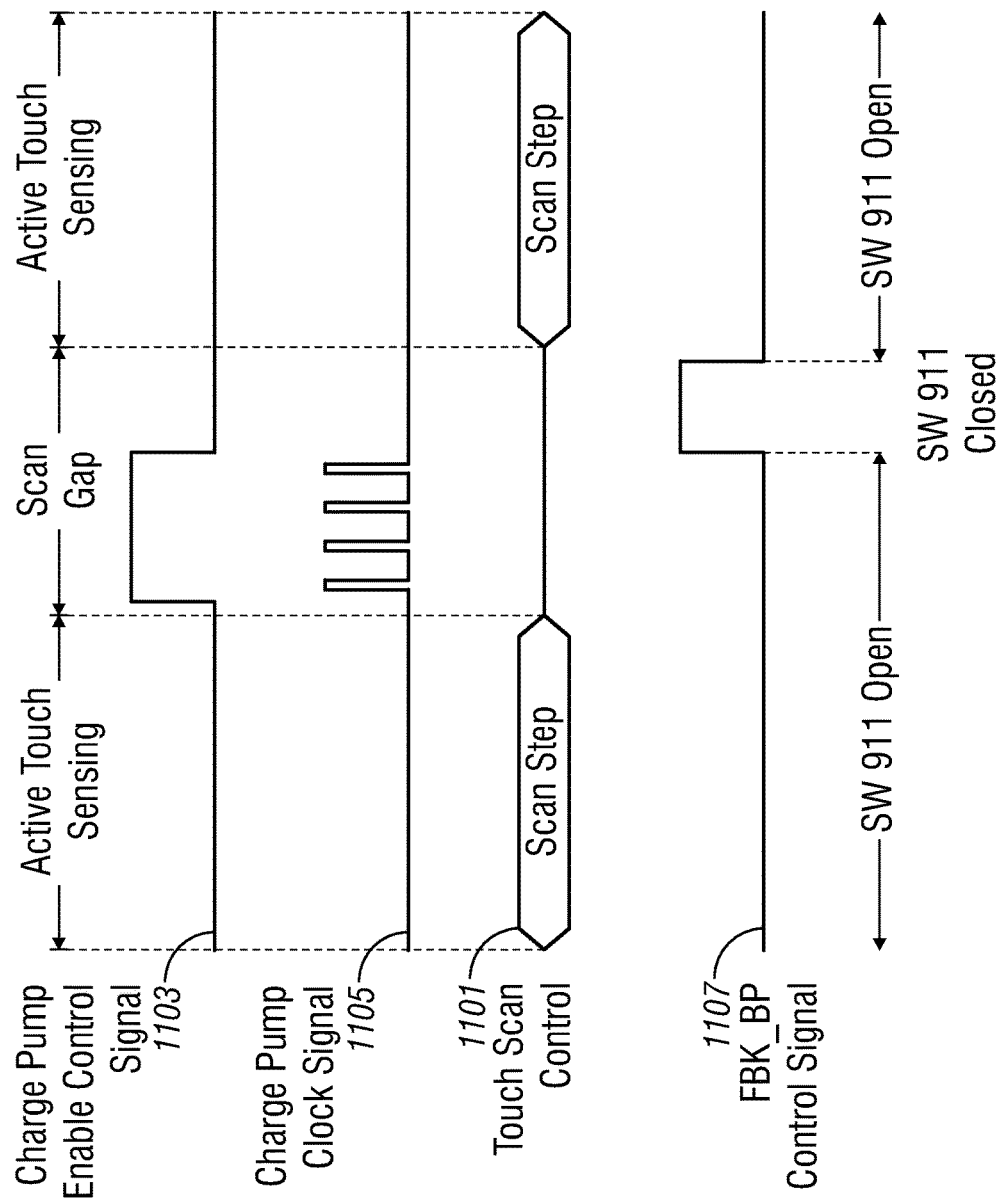
FIG. 11 illustrates more details of an example touch sensing phase operation of a touch screen device according to various embodiments.

FIG. 11 illustrates more details of an example touch sensing phase operation of touch screen device 900 according to various embodiments of the disclosure. FIG. 11 shows a portion of a touch sensing phase of touch screen device 900 including periods of active touch sensing, during which a touch scan control 1101 of a touch controller (not shown) can perform touch scan steps to actively scan the touch screen. During a scan gap in between active touch sensing, a charge pump enable control signal 1103 of the touch controller can enable negative charge pump 902 for a portion of the scan gap. While negative charge pump 902 is enabled, a charge pump clock signal 1105 can clock the negative charge pump multiple times corresponding to multiple applications of VGL 905 to gate line 915. Charge pump enable control signal 1103 can disable negative charge pump 902, and feedback bypass controller 913 can send a feedback bypass control signal 1107 to close feedback bypass switch 911 to short the feedback loop of sense amplifier 906. Feedback bypass control signal 1107 can open feedback bypass switch 911 prior to the next touch scan step, during which sense amplifier 906 can receive and amplify sense signals for further processing to determine touch.

Although embodiments of this disclosure have been fully described with reference to the accompanying drawings, it is to be noted that various changes and modifications including, but not limited to, combining features of different embodiments, omitting a feature or features, etc., as will be apparent to those skilled in the art in light of the present description and figures. For example, while the foregoing may describe example embodiments that can include multiple elements that can be used to reduce or eliminate effects of noise in touch sensing, such as an LDO, which can further include a capacitor (e.g., gate line capacitor 925), a voltage boost system, and a post-noise stabilizer system (e.g., feedback bypass switch 911 and feedback bypass controller 913), and corresponding methods of operation (e.g., various processes described in reference to FIG. 10), it should be noted that each of these elements can be used independently of the others. In other words, some embodiments can include only one of these elements and/or processes, while other embodiments can include various combinations of two or more of these elements and/or processes, as one skilled in the art would readily understand in light of the disclosure.

It should be understood that one or more of the functions of performing touch sensing, controlling gate line voltages, etc., described above can be performed by computer-executable instructions, such as software/firmware, residing in a medium, such as a memory, that can be executed by a processor, as one skilled in the art would understand. The software/firmware can be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any physical medium that can contain or store the program for use by or in connection with the instruction execution system, apparatus, or device. The non-transitory computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks, and the like. In the context of this document, a "non-transitory computer-readable storage medium" does not include signals. In contrast, in the context of this document, a "computer-readable medium" can include all of the media described above, and can also include signals.

Although various embodiments are described with respect to display pixels, one skilled in the art would understand that the term display pixels can be used interchangeably with the term display sub-pixels in embodiments in which display pixels are divided into sub-pixels. For example, some embodiments directed to RGB displays can include display pixels divided into red, green, and blue sub-pixels. One skilled in the art would understand that other types of display screen could be used. For example, in some embodiments, a sub-pixel may be based on other colors of light or other wavelengths of electromagnetic radiation (e.g., infrared) or may be based on a monochromatic configuration, in which each structure shown in the figures as a sub-pixel can be a pixel of a single color.

What is claimed is:

1. An integrated touch screen system comprising:
a touch screen including a plurality of display pixels, the plurality of display pixels including an addressing system that includes a plurality of conductive lines;
a voltage regulator;
a driver configured to receive first voltages from the voltage regulator and apply second voltages to the conductive lines based on the received first voltages, the first voltages having a stable level;
a display system that updates an image displayed by the display pixels during a display phase, wherein the updating of the image includes actively operating a power supply to apply third voltages to the voltage regulator, and operating the driver to apply the second voltages to the conductive lines to address the display pixels; and
a touch sensing system that senses touch during a touch sensing phase, the touch sensing phase including a plurality of active sensing periods during which the touch sensing system performs active touch sensing while the power supply is not actively applying the third voltages to the voltage regulator, the touch sensing phase further including at least one gap period between active sensing periods, wherein the power supply is actively operated to apply the third voltages to the voltage regulator, and the driver is operated to apply the second voltages to the conductive lines during the at least one gap period while active touch sensing is not being performed, wherein the power supply applies the third voltages during the one or more gap periods such that the voltage regulator is able to apply the first voltages to the driver during the active sensing periods.

2. The integrated touch screen system of claim 1, wherein each display pixel includes a pixel thin-film transistor (TFT), and the conductive lines include gate lines, each pixel TFT being connected to one gate line.

3. The integrated touch screen system of claim 1, wherein the power supply includes one of a charge pump and an inductive boost regulator.

4. The integrated touch screen system of claim 1, wherein the display system controls the power supply to apply the third voltages to the voltage regulator during at least part of the display phase, and the touch sensing system controls the power supply to apply the third voltages to the voltage regulator during at least part of the touch sensing phase.

5. The integrated touch screen system of claim 1, further comprising:
a voltage boost system that boosts the third voltages applied by the power supply during the touch sensing phase, such that a magnitude of the third voltages applied to the voltage regulator during the touch sensing phase is greater than the magnitude of the third voltages applied to the voltage regulator during the display phase.

6. The integrated touch screen system of claim 1, wherein an output voltage level of the power supply is based on a first reference voltage during the display phase, and the output voltage level of the power supply is based on a second reference voltage during the at least one gap period.

7. The integrated touch screen system of claim 1, wherein an output voltage level of the power supply is based on a first reference voltage during the display phase, the output voltage level of the power supply is based on a second reference voltage during the at least one gap period, an output voltage level of the voltage regulator is based on a third reference voltage during the display phase, and the output voltage level of the voltage regulator is based on a fourth reference voltage during the at least one gap period.

8. The integrated touch screen system of claim 1, wherein the power supply applies the third voltages to the voltage regulator during a first portion of the at least one gap period, the touch sensing system including a plurality of drive lines that are stimulated with drive signals during the active sensing periods, and a sense amplifier that receives a sense signal corresponding to the one or more drive signals, the integrated touch screen system further comprising: a post-noise stabilization system that resets the sense amplifier during a second portion of the at least one gap period, the second portion being after the first portion.

9. The integrated touch screen system of claim 8, wherein the post-noise stabilization system includes a switch connected to a feedback loop of the sense amplifier, and wherein resetting the sense amplifier includes closing the switch to short the feedback loop.

10. A method of managing power in a touch screen system that includes a touch screen including a plurality of display pixels, the plurality of display pixels including an addressing system that includes a plurality of conductive lines, the integrated touch screen system further comprising a driver configured to receive first voltages from a voltage regulator and apply second voltages to the conductive lines based on the received first voltages, the first voltages having a stable level, the method comprising:
updating an image displayed by the display pixels during a display phase, wherein the updating of the image includes actively operating a power supply to apply third voltages to the voltage regulator, and operating the driver to apply second voltages to the conductive lines to address the display pixels; and
sensing touch during a touch sensing phase, the touch sensing phase including a plurality of active sensing periods during which the touch sensing system performs active touch sensing while the power supply is not actively applying the third voltages to the voltage regulator, the touch sensing phase further including at least one gap period between active sensing periods, wherein the power supply is actively operated to apply the third voltages to the voltage regulator, and the driver is operated to apply the second voltages to the conductive lines during the at least one gap period while active touch sensing is not being performed, wherein the power supply applies the third voltages during the one or more gap periods such that the voltage regulator is able to apply the first voltages to the driver during the active sensing periods.

11. The method of claim 10, wherein a display system controls the power supply to apply the third voltages to the voltage regulator during at least part of the display phase, and a touch sensing system controls the power supply to apply the third voltages to the voltage regulator during at least part of the touch sensing phase, the method further comprising:
generating a synchronization signal between the display system and the touch sensing system, wherein the control of the power supply is based on the synchronization signal.

12. The method of claim 10, further comprising:
boosting the third voltages applied by the power supply during the touch sensing phase, such that the magnitude of the third voltages applied to the voltage regulator during the touch sensing phase is greater than the magnitude of the third voltages applied to the voltage regulator during the display phase.

13. The method of claim 10, wherein an output voltage level of the power supply is based on a first reference voltage during the display phase, and the output voltage level of the power supply is based on a second reference voltage during the at least one gap period.

14. The method of claim 10,
wherein an output voltage level of the power supply is based on a first reference voltage during the display phase, the output voltage level of the power supply is based on a second reference voltage during the at least one gap period, an output voltage level of the voltage regulator is based on a third reference voltage during the display phase, and the output voltage level of the voltage regulator is based on a fourth reference voltage during the at least one gap period.

15. The method of claim 10, wherein the touch screen system includes a touch sensing system including a plurality of drive lines that are stimulated with drive signals during the active sensing periods, and a sense amplifier that receives a sense signal corresponding to one or more drive signals, and wherein applying the third voltages during the at least one gap period includes applying the third voltages during a first portion of the at least one gap period, the method further comprising:
resetting the sense amplifier during a second portion of the at least one gap period, the second portion being after the first portion.

16. The method of claim 15, wherein resetting the sense amplifier includes shorting a feedback loop of the sense amplifier.

17. An integrated touch screen system comprising:
a touch screen including a plurality of display pixels, the plurality of display pixels including an addressing system that includes a plurality of conductive lines;
a voltage regulator;
a capacitor coupled to an input of the voltage regulator;
a driver configured to receive first voltages from the voltage regulator and apply second voltages to the conductive lines based on the received first voltages, the first voltages having a stable level;

a display system that updates an image displayed by the display pixels during a display phase, wherein the updating of the image includes actively operating a power supply to apply third voltages to the voltage regulator, and operating the driver to apply the second voltages to the conductive lines to address the display pixels; and a touch sensing system that senses touch during a touch sensing phase, the touch sensing phase including a plurality of active sensing periods during which the touch sensing system performs active touch sensing while the power supply is not actively applying the third voltages to the voltage regulator, the touch sensing phase further including at least one gap period between active sensing periods, wherein the power supply is actively operated to apply the third voltages to the voltage regulator, and the driver is operated to apply the second voltages to the conductive lines during the at least one gap period while active touch sensing is not being performed, wherein the capacitor is charged while the power supply is actively operated to apply the third voltages, and the charge is transferred from the capacitor to the input of the voltage regulator during the touch phase while the power supply is not actively applying third voltages.

18. The integrated touch screen system of claim 17, wherein each display pixel includes a pixel thin-film transistor (TFT), and the conductive lines include gate lines, each pixel TFT being connected to one gate line.

19. The integrated touch screen system of claim 17, wherein the power supply includes one of a charge pump and an inductive boost regulator.

20. The integrated touch screen system of claim 17, wherein the display system controls the power supply to apply the third voltages to the voltage regulator during at least part of the display phase, and the touch sensing system controls the power supply to apply the third voltages to the voltage regulator during at least part of the touch sensing phase.

21. The integrated touch screen system of claim 17, further comprising:

a voltage boost system that boosts the third voltages applied by the power supply during the touch sensing phase, such that a magnitude of the third voltages applied to the voltage regulator during the touch sensing phase is greater than the magnitude of the third voltages applied to the voltage regulator during the display phase.

22. The integrated touch screen system of claim 17, wherein an output voltage level of the power supply is based on a first reference voltage during the display phase, and the output voltage level of the power supply is based on a second reference voltage during the at least one gap period.

23. The integrated touch screen system of claim 17, wherein an output voltage level of the power supply is based on a first reference voltage during the display phase, the output voltage level of the power supply is based on a second reference voltage during the at least one gap period, an output voltage level of the voltage regulator is based on a third reference voltage during the display phase, and the output voltage level of the voltage regulator is based on a fourth reference voltage during the at least one gap period.

24. The integrated touch screen system of claim 17, wherein the power supply applies the third voltages to the voltage regulator during a first portion of the at least one gap period, the touch sensing system including a plurality of drive lines that are stimulated with drive signals during the active sensing periods, and a sense amplifier that receives a sense signal corresponding to the one or more drive signals, the integrated touch screen system further comprising: a post-noise stabilization system that resets the sense amplifier during a second portion of the at least one gap period, the second portion being after the first portion.

25. The integrated touch screen system of claim 24, wherein the post-noise stabilization system includes a switch connected to a feedback loop of the sense amplifier, and wherein resetting the sense amplifier includes closing the switch to short the feedback loop.

26. A method of managing power in a touch screen system that includes a touch screen including a plurality of display pixels, the plurality of display pixels including an addressing system that includes a plurality of conductive lines, the integrated touch screen system further comprising a driver configured to receive first voltages from a voltage regulator and apply second voltages to the conductive lines based on the received first voltages, the first voltages having a stable level, the method comprising:

updating an image displayed by the display pixels during a display phase, wherein the updating of the image includes actively operating a power supply to apply third voltages to the voltage regulator, and operating the driver to apply second voltages to the conductive lines to address the display pixels; and sensing touch during a touch sensing phase, the touch sensing phase including a plurality of active sensing periods during which the touch sensing system performs active touch sensing while the power supply is not actively applying the third voltages to the voltage regulator, the touch sensing phase further including at least one gap period between active sensing periods, wherein the power supply is actively operated to apply the third voltages to the voltage regulator, and the driver is operated to apply the second voltages to the conductive lines during the at least one gap period while active touch sensing is not being performed, wherein a capacitor coupled to the input of the voltage regulator is charged while the power supply is actively operated to apply the third voltages, and the charge is transferred from the capacitor to the input of the voltage regulator during the touch phase while the power supply is not actively applying third voltages.

27. The method of claim 26, wherein a display system controls the power supply to apply the third voltages to the voltage regulator during at least part of the display phase, and a touch sensing system controls the power supply to apply the third voltages to the voltage regulator during at least part of the touch sensing phase, the method further comprising:

generating a synchronization signal between the display system and the touch sensing system, wherein the control of the power supply is based on the synchronization signal.

28. The method of claim 26, further comprising:

boosting the third voltages applied by the power supply during the touch sensing phase, such that the magnitude of the third voltages applied to the voltage regulator during the touch sensing phase is greater than the magnitude of the third voltages applied to the voltage regulator during the display phase.

29. The method of claim 26, wherein an output voltage level of the power supply is based on a first reference voltage during the display phase, and the output voltage level of the power supply is based on a second reference voltage during the at least one gap period.

30. The method of claim 26, wherein an output voltage level of the power supply is based on a first reference voltage during the display phase, the output voltage level of the power supply is based on a second reference voltage during the at least one gap period, an output voltage level of the voltage regulator is based on a third reference voltage during the display phase, and the output voltage level of the voltage regulator is based on a fourth reference voltage during the at least one gap period.

31. The method of claim 26, wherein the touch screen system includes a touch sensing system including a plurality of drive lines that are stimulated with drive signals during the active sensing periods, and a sense amplifier that receives a sense signal corresponding to one or more drive signals, and wherein applying the third voltages during the at least one gap period includes applying the third voltages during a first portion of the at least one gap period, the method further comprising:

resetting the sense amplifier during a second portion of the at least one gap period, the second portion being after the first portion.

32. The method of claim 31, wherein resetting the sense amplifier includes shorting a feedback loop of the sense amplifier.

\* \* \* \* \*